US012693819B2

(12) United States Patent
Araki

(10) Patent No.: US 12,693,819 B2
(45) Date of Patent: Jul. 28, 2026

(54) SERVER APPARATUS AND METHOD THEREFOR

(71) Applicant: TOSHIBA TEC KABUSHIKI KAISHA, Tokyo (JP)

(72) Inventor: Satoshi Araki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 323 days.

(21) Appl. No.: 18/624,951

(22) Filed: Apr. 2, 2024

(65) Prior Publication Data

US 2024/0393994 A1 Nov. 28, 2024

(30) Foreign Application Priority Data

May 22, 2023 (JP) ................................. 2023-083995

(51) Int. Cl.
*G06F 3/12* (2006.01)

(52) U.S. Cl.
CPC ............ *G06F 3/126* (2013.01); *G06F 3/1208* (2013.01)

(58) Field of Classification Search
None
See application file for complete search history.

(56) References Cited

U.S. PATENT DOCUMENTS

2016/0313952 A1 10/2016 Kawasaki et al.
2018/0173467 A1* 6/2018 Lankreijer ............ G06F 3/1273
2021/0240415 A1* 8/2021 Saigusa ................. G06F 3/1232

FOREIGN PATENT DOCUMENTS

JP 2005-007659 A 1/2005
JP 2005-342963 A 12/2005
JP 2016-043492 A 4/2016
JP 2019-209524 A 12/2019

OTHER PUBLICATIONS

Notice of Reasons for Refusal dated Jan. 20, 2026 issued in JP Application No. 2023-083995, with English translation, 6 pages.

* cited by examiner

*Primary Examiner* — Lennin R Rodriguezgonzalez
(74) *Attorney, Agent, or Firm* — FOLEY & LARDNER LLP

(57) ABSTRACT

A server apparatus that communicates with a plurality of image forming apparatuses respectively having scan functions and a user terminal that provides an image that should be formed by any one of the plurality of image forming apparatuses. The server apparatus includes a receiving unit, an analyzing unit, and a determining unit. The receiving unit receives job information indicating the image that should be formed transmitted by the user terminal. The analyzing unit analyzes density in the image from the job information. The determining unit determines, based on the density information and image quality information of each of the plurality of image forming apparatuses obtained by scanning, in each of the plurality of image forming apparatuses, reference paper on which monochrome reference images having gradations in a second direction orthogonal to a first direction are formed in separated positions of at least two parts in the first direction, a proper machine suitable for forming the image out of the plurality of image forming apparatuses.

15 Claims, 12 Drawing Sheets

*FIG. 3*

SERVER APPARATUS — 100

11 — PROCESSOR

111 — IMAGE QUALITY ACQUIRING UNIT

112 — EQUIPMENT INFORMATION ACQUIRING UNIT

113 — PRINTING JOB RECEIVING UNIT

114 — ANALYZING UNIT

115 — MACHINE DETERMINING UNIT

116 — PRINTING JOB TRANSMITTING UNIT

MAIN MEMORY — 12

AUXILIARY STORAGE DEVICE — 13

IMAGE QUALITY DB — 131

EQUIPMENT DB — 132

PRINTING JOB STORAGE UNIT — 133

COMMUNICATION INTERFACE — 14

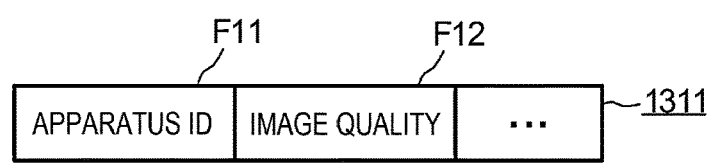

F11     F12

| APPARATUS ID | IMAGE QUALITY | ... | — 1311 |

*FIG. 5*

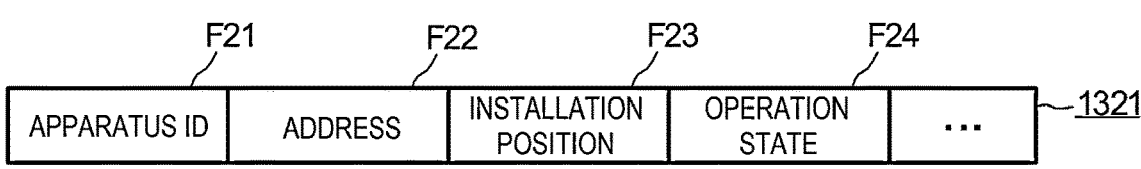

F21    F22    F23    F24

| APPARATUS ID | ADDRESS | INSTALLATION POSITION | OPERATION STATE | ... | — 1321 |

FIG. 8

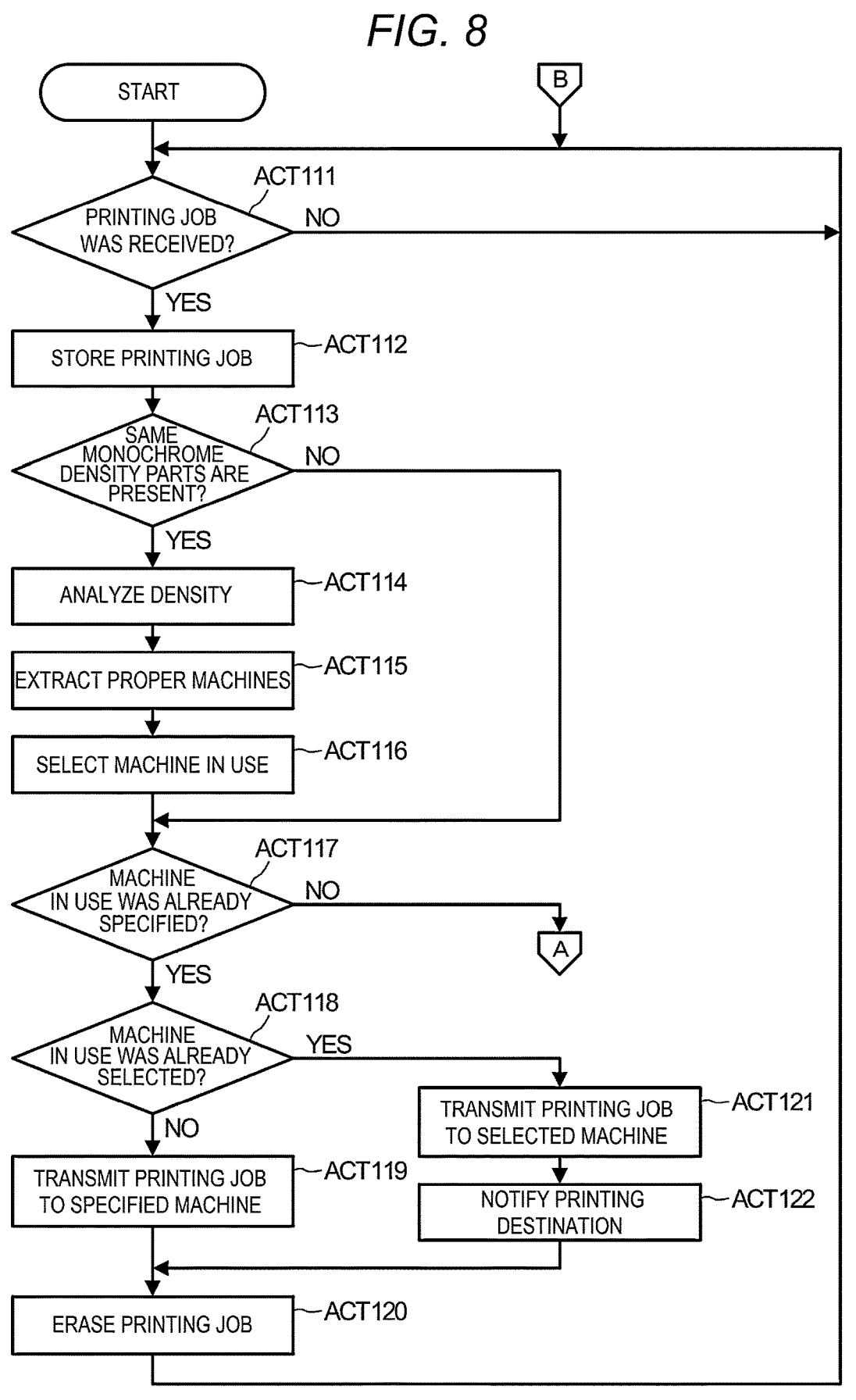

```
                                              ┌───┐
                                              │ B │
                                              └─┬─┘
         ┌─────────────┐                        │
         │    START    │                        │
         └──────┬──────┘                        │
                │                               │
                ▼                               │
         ╱ACT111╲                               │
        ╱ PRINTING ╲        NO                  │
       ╱ JOB WAS    ╲──────────────────────────┤
        ╲ RECEIVED? ╱                           │
         ╲         ╱                            │
              │ YES                             │
              ▼                                 │
      ┌──────────────────┐  ACT112              │
      │ STORE PRINTING JOB│                     │
      └────────┬─────────┘                      │
               │                                │
               ▼                                │
          ╱ACT113╲                              │
         ╱  SAME   ╲       NO                   │
        ╱MONOCHROME ╲─────────────┐             │
       ╱DENSITY PARTS╲            │             │
        ╲ARE PRESENT?╱            │             │
         ╲          ╱             │             │
              │ YES               │             │
              ▼                   │             │
      ┌──────────────┐ ACT114     │             │
      │ANALYZE DENSITY│           │             │
      └──────┬───────┘            │             │
             ▼                    │             │
   ┌──────────────────┐ACT115     │             │
   │EXTRACT PROPER MACH│           │             │
   └──────┬───────────┘           │             │
          ▼                       │             │
   ┌──────────────────┐ACT116     │             │
   │SELECT MACHINE IN USE│         │             │
   └──────┬───────────┘           │             │
          │◄──────────────────────┘             │
          ▼                                      │
     ╱ACT117╲                                    │
    ╱ MACHINE ╲       NO        ┌───┐            │
   ╱IN USE WAS  ╲───────────────│ A │            │
    ╲ALREADY    ╱               └───┘            │
     ╲SPECIFIED?╱                                │
          │ YES                                  │
          ▼                                      │
     ╱ACT118╲                                    │
    ╱ MACHINE ╲      YES                         │
   ╱IN USE WAS  ╲──────────────┐                 │
    ╲ALREADY    ╱              │                 │
     ╲SELECTED? ╱              ▼                  │
          │ NO        ┌──────────────────┐ACT121 │
          ▼           │TRANSMIT PRINTING  │       │
  ┌──────────────────┐│JOB TO SELECTED    │       │
  │TRANSMIT PRINTING ││MACHINE            │       │
  │JOB TO SPECIFIED  ││                   │       │
  │MACHINE   ACT119  │└────────┬─────────┘       │
  └──────┬───────────┘         ▼                  │
         │            ┌──────────────────┐ACT122 │
         │            │NOTIFY PRINTING    │       │
         │            │DESTINATION        │       │
         │            └────────┬─────────┘       │
         │◄────────────────────┘                 │
         ▼                                        │
  ┌──────────────┐ ACT120                         │
  │ERASE PRINTING JOB│                            │
  └──────┬───────┘                                │
         └────────────────────────────────────────┘
```

SERVER APPARATUS AND METHOD THEREFOR

CROSS-REFERENCE TO RELATED APPLICATION

This application is based upon and claims the benefit of priority from Japanese Patent Application No. 2023-083995, filed on May 22, 2023, the entire contents of which are incorporated herein by reference.

FIELD

Embodiments described herein relate generally to a server apparatus and a method therefor.

BACKGROUND

An image forming apparatus installed in a workplace forms an image on paper. A general image forming apparatus irradiates a photoconductive drum with image light from an exposure device to thereby form a latent image on the photoconductive drum. The image forming apparatus visualizes the latent image with a developing material (a developer) to obtain a visible image. The image forming apparatus once moves the visible image to a transfer belt and further moves the visible image moved to the transfer belt onto paper. The image forming apparatus fixes the visible image moved onto the paper on the paper.

As a form of use of such an image forming apparatus, characters were mainly printed on plain paper in most cases. However, according to needs for performing on-demand printing of printing performed using a plate in the past, recently, opportunities of high-quality poster printing and on-demand printing on special paper performed using image forming apparatuses increase. In such printing, there are requests for higher-quality printing than the quality of printing for mainly printing characters in the past.

On the other hand, in the image forming apparatus, although high-end machines can meet the high-quality printing request in the high-quality poster printing and the on-demand printing on the special paper, low-end machines are capable of performing the on-demand printing but sometimes cannot meet the high-quality printing request. Among the high-end machines, there is a slight level difference for each of the machines in, for example, a density difference between images formed on the front side and the rear side of the apparatus.

BRIEF DESCRIPTION OF THE DRAWINGS

FIG. 3 is a block diagram illustrating an example of a circuit configuration of the server apparatus;

FIG. 4 is a schematic diagram illustrating an example of a data structure of a quality information record stored in an image quality database included in the server apparatus;

FIG. 5 is a schematic diagram illustrating an example of a data structure of an equipment information record stored in an equipment database included in the server apparatus;

FIG. 8 is a diagram illustrating a first portion of a series of flowcharts illustrating an example of operation management processing in the server apparatus;

DETAILED DESCRIPTION

Figure 1:
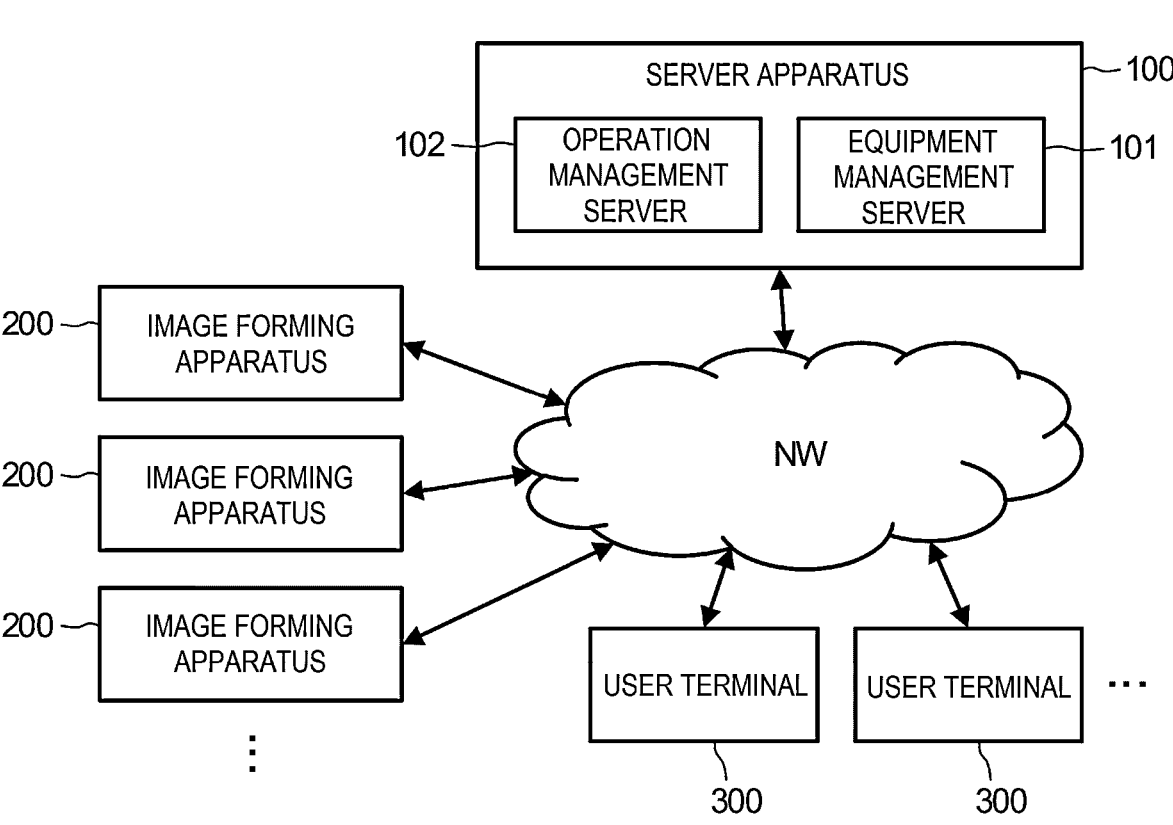
FIG. 1 is a schematic configuration diagram of a printing system including a server apparatus according to a first embodiment.

An object of at least one embodiment is to provide a server apparatus that makes it possible to determine an image forming apparatus that can meet a high-quality printing request of a user.

According to at least one embodiment, there is provided a server apparatus that communicates with a plurality of image forming apparatuses respectively having scan functions and a user terminal that provides an image that should be formed by any one of the plurality of image forming apparatuses. The server apparatus includes a receiving unit (receiver), an analyzing unit (analyzer), and a determining unit (calculator). The receiving unit receives job information indicating the image that should be formed transmitted by the user terminal. The analyzing unit analyzes density in the image from the job information. The determining unit determines, based on the density information and image quality information of each of the plurality of image forming apparatuses obtained by scanning, in each of the plurality of image forming apparatuses, reference paper on which monochrome reference images having gradations in a second direction orthogonal to a first direction are formed in separated positions of at least two parts in the first direction, a proper machine suitable for forming the image out of the plurality of image forming apparatuses.

Image forming apparatuses according to embodiments are explained below with reference to the drawings. Note that, in the drawings referred to in the following explanation of the embodiments, scales of units are changed as appropriate.

In the drawings referred to in the following explanation of the embodiments, components are omitted as appropriate for explanation.

First Embodiment

FIG. 1 is a schematic configuration diagram of a printing system including a server apparatus 100 according to a first embodiment. The printing system further includes a plurality of image forming apparatuses 200 and a plurality of user terminals 300. The server apparatus 100 can be communicably connected to the image forming apparatuses 200 and the user terminals 300 via a network NW. The connection between the server apparatus 100, the image forming apparatuses 200, and the user terminals 300 and the network NW may be wired connection or may be wireless connection.

The server apparatus 100 is a print server that receives printing jobs from the user terminals 300 and transmits the printing jobs to the image forming apparatuses 200. The server apparatus 100 includes two virtual server functions of an equipment management server 101 and an operation management server 102. The equipment management server 101 manages the image forming apparatuses 200 and the user terminals 300. The operation management server 102 controls operations of the image forming apparatuses 200.

Note that the server apparatus 100 may be, for example, a server apparatus operated by a print service company that expands print service stations to various places. In this case, the network NW can be a public network such as the Internet. The server apparatus 100 may be an in-house server apparatus disposed in a company. In this case, the network NW can be an in-house LAN (Local Area Network).

The image forming apparatuses 200 are disposed in workplaces such as print service stations and companies.

The user terminals 300 are information processing devices such as a personal computer (PC), a smartphone, a tablet terminal, and a digital camera that instruct printing in any ones of the image forming apparatuses 200. The user terminals 300 may be present in the workplaces or may be present outside the workplaces.

Figure 2:
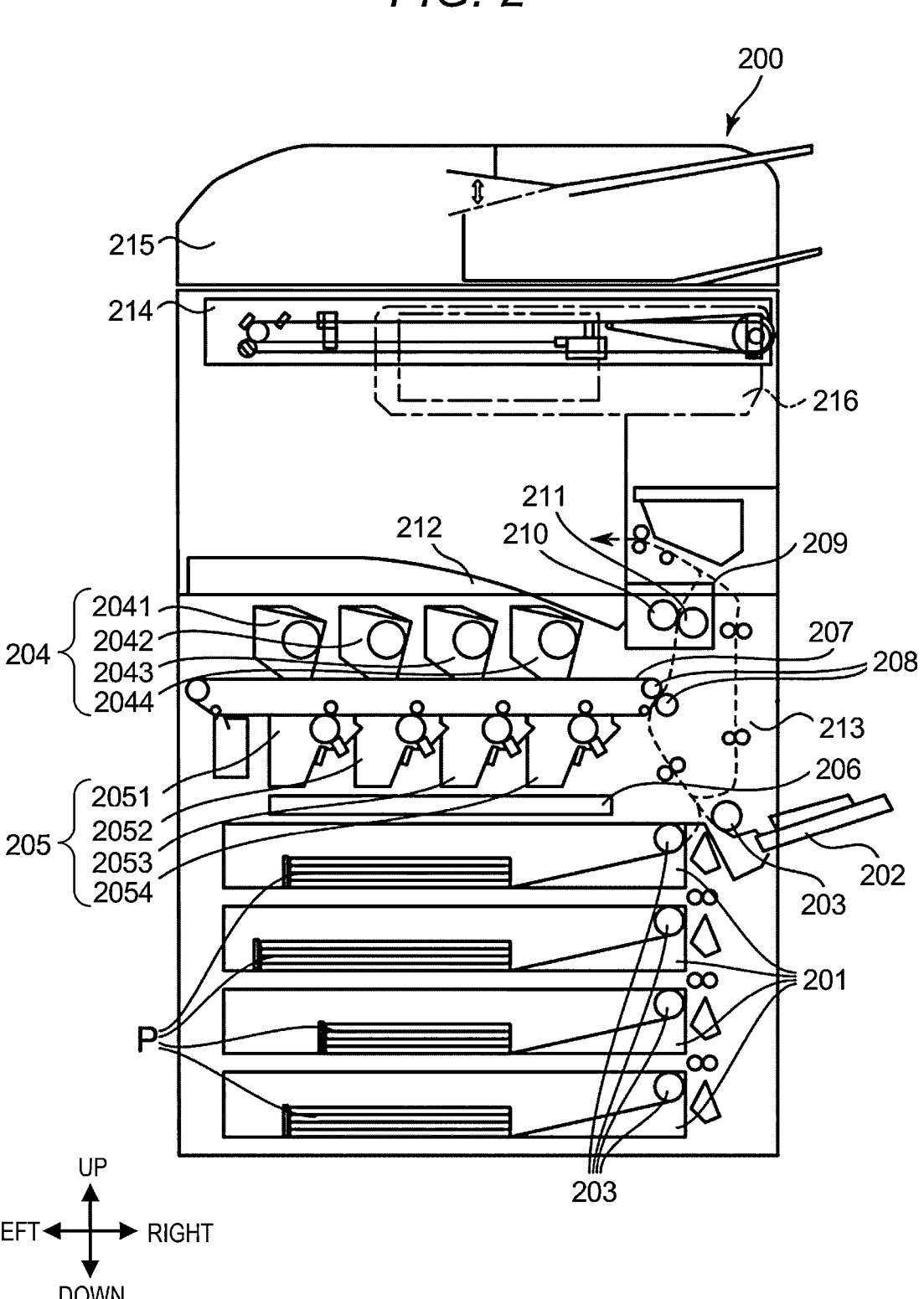
FIG. 2 is a schematic sectional view illustrating an example of a configuration of an image forming apparatus.

FIG. 2 is a schematic sectional view illustrating an example of the image forming apparatus 200. Note that, in FIG. 2, a paper surface front direction is a front direction of the image forming apparatus 200 and a paper surface depth direction is a rear direction of the image forming apparatus 200. The up, down, left, and right directions of the image forming apparatus 200 are as illustrated in FIG. 2. The image forming apparatus 200 is explained below with reference to FIG. 2.

The image forming apparatus 200 performs printing with an electrophotographic scheme. The image forming apparatus 200 is a multi-function peripheral (hereinafter abbreviated as MFP) including at least a scan function and a print function. As illustrated in FIG. 2, as an example, the image forming apparatus 200 includes a paper feeding tray 201, a manual feed tray 202, a paper feeding roller 203, a toner cartridge 204, an image forming unit 205, an optical scanning device 206, a transfer belt 207, a transfer roller 208, a fixing unit 209, a heating unit 210, a pressurizing roller 211, a paper discharge tray 212, a duplex unit 213, a scan unit 214, a document feeding device 215, and a control panel 216.

The image forming unit 205 prints an image with the electrophotographic scheme. That is, the image forming unit 205 forms an image on an image forming medium P or the like using toner. The image forming medium P is, for example, sheet-like paper. The scan unit 214 reads an image from an original document or the like on which the image is formed. For example, the image forming apparatus 200 prints the image read from the original document or the like using the scan unit 214 on the image forming medium P using the image forming unit 205 to thereby implement document copy.

The paper feeding tray 201 stores image forming media P used for printing.

The manual feed tray 202 is a stand for manually feeding the image forming media P.

The paper feeding roller 203 rotates according to action of a motor to carry out the image forming medium P stored in the paper feeding tray 201 or the manual feed tray 202 from the paper feeding tray 201 or the manual feed tray 202. The toner cartridge 204 stores toner to be supplied to the image forming unit 205. The image forming apparatus 200 includes a plurality of toner cartridges 204. As an example, as illustrated in FIG. 2, the image forming apparatus 200 includes four toner cartridges 204, that is, a toner cartridge 2041, a toner cartridge 2042, a toner cartridge 2043, and a toner cartridge 2044. The toner cartridge 2041, the toner cartridge 2042, the toner cartridge 2043, and the toner cartridge 2044 respectively store toners corresponding to colors of CMYK (cyan, magenta, yellow, and black). Note that colors of the toners stored by the toner cartridges 204 are not limited to the colors of CMYK and may be other colors. The toners stored by the toner cartridges 204 may be special toners. For example, the toner cartridges 204 may store decolorable toners that are decolored at temperature higher than a predetermined temperature to be invisible.

The image forming unit 205 includes a developing device and a photoconductive drum. The developing device develops an electrostatic latent image on the surface of the photoconductive drum using toner supplied from the toner cartridge 204. Consequently, a toner image is formed on the surface of the photoconductive drum. The image formed on the surface of the photoconductive drum is transferred (primarily transferred) onto the transfer belt 207. The image forming apparatus 200 includes a plurality of image forming units 205. As an example, as illustrated in FIG. 2, the image forming apparatus 200 includes four image forming units 205, that is, an image forming unit 2051, an image forming unit 2052, an image forming unit 2053, and an image forming unit 2054. The image forming unit 2051, the image forming unit 2052, the image forming unit 2053, and the image forming unit 2054 respectively receive supply of toners corresponding to the colors of CMYK and form images.

The optical scanning device 206 is called LSU (laser scanning unit) or the like as well. The optical scanning device 206 forms an electrostatic latent image on the surfaces of photoconductive drums of the image forming units 205 with laser light controlled according to image data.

The transfer belt 207 is, for example, an endless belt and is rotatable by action of rollers. The transfer belt 207 rotates to convey images transferred from the image forming units 205 to the position of the transfer roller 208.

The transfer roller 208 includes two rollers facing each other. The transfer roller 208 transfers (secondarily transfers) an image formed on the transfer belt 207 onto the image forming medium P passing between the rollers of the transfer roller 208.

The fixing unit 209 performs heating and pressurization on the image forming medium P on which the image is transferred. Consequently, the image transferred on the image forming medium P is fixed. The fixing unit 209 includes the heating unit 210 and the pressurizing roller 211 facing each other.

The heating unit 210 is, for example, a roller including a heat source for heating the heating unit 210. The heat source is, for example, a heater. The roller heated by the heat source heats the image forming medium P.

Alternatively, the heating unit 210 may include an endless belt suspended by a plurality of rollers. For example, the heating unit 210 includes a plate-like heat source, an endless belt, a belt conveying roller, a tension roller, and a press roller. The endless belt is, for example, a film-like member. The belt conveying roller drives the endless belt. The tension roller applies tension to the endless belt. An elastic layer is formed on the surface of the press roller. The plate-like heat source comes into contact with the inner side of the endless belt and is pressed in the direction of the press roller to form a fixing nip having a predetermined width between the plate-like heat source and the press roller. Since the plate-like heat source is configured to perform heating while forming a nip region, responsiveness at an energization time is higher than responsiveness in the case of a heating scheme by a halogen lamp.

In the endless belt, for example, a silicon rubber layer having thickness of 200 μm is formed on the outer side on a SUS (steel use stainless) base material having thickness of 50 μm or polyimide, which is heat resistant resin, having thickness of 70 μm. The outermost circumference of the endless belt is coated with a surface protection layer of PFA (perfluoroalkoxy alkane) or the like. In the press roller, for example, a silicon sponge layer having thickness of 5 mm is formed on the surface of a φ10 mm iron bar. The outermost circumference of the press roller is coated with a surface protection layer of PFA or the like.

In the plate-like heat source, for example, a grazed layer and a heat generation resistant layer are stacked on a ceramic substrate. A heat sink made of aluminum is bonded to the plate-like heat source in order to allow excess heat to escape to the opposite side and in order to prevent a warp of a base. The heat generation resistant layer is formed of a known material such as TaSiO2 and is divided into a predetermined length and a predetermined number of pieces in a main scanning direction.

The pressurizing roller 211 pressurizes the image forming medium P passing between the pressurizing roller 211 and the heating unit 210.

The paper discharge tray 212 is a stand onto which the image forming medium P on which printing is finished is discharged.

The duplex unit 213 brings the image forming medium P into a state in which printing on the rear surface thereof is possible. For example, the duplex unit 213 switches back the image forming medium P using a roller or the like to reverse the front and the back of the image forming medium P.

The scan unit 214 reads an image from an original document. The scan unit 214 is equivalent to a scanner for reading an image from an original document.

The scanner is an optical reduction type including an imaging element such as a CCD (charge-coupled device) image sensor. Alternatively, the scanner is a contact image sensor (CIS) type including an imaging element such as a CMOS (complementary metal-oxide-semiconductor) image sensor. Alternatively, the scanner is another publicly-known type.

The document feeding device 215 is called, for example, ADF (auto document feeder) as well. The document feeding device 215 conveys original documents placed on a document tray one after another. Images are read from the conveyed original documents by the scan unit 214. The document feeding device 215 may include a scanner for reading images from the rear surfaces of the original documents.

The control panel 216 functions as a user interface and includes buttons, a touch panel, and the like to be operated by an operator of the image forming apparatus 200. In the touch panel, for example, a display such as a liquid crystal display or an organic EL display and a pointing device by touch input are stacked. Therefore, the buttons and the touch panel function as an input device for receiving operation by the operator of the image forming apparatus 200. The display included in the touch panel functions as a display device that notifies various kinds of information to the operator of the image forming apparatus 200.

In the image forming apparatus 200, which is the MFP, explained above, in general, image reading performance of the scan unit 214 and image forming performance of the image forming unit 205 correspond to each other. Accordingly, if document copy is implemented by printing an image read from an original document or the like using the scan unit 214 on the image forming medium P using the image forming unit 205, the image forming apparatus 200 can print the image on the image forming medium P with the quality of the read image on the original document. In such an image forming apparatus 200, it is also possible to implement feedback control for printing a test pattern image using the image forming unit 205, reading the test pattern image with the scan unit 214 to discriminate a state of the image forming unit 205, and adjusting an image forming operation of the image forming unit 205.

FIG. 3 is a block diagram illustrating an example of a circuit configuration of the server apparatus 100 according to the first embodiment. As an example, the server apparatus 100 includes a processor 11, a main memory 12, an auxiliary storage device 13, and a communication interface 14. The main memory 12, the auxiliary storage device 13, and the communication interface 14 are connected to the processor 11 by a bus line 15 such as an address bus or a data bus.

The processor 11 is equivalent to a central part of a computer that performs processing such as an arithmetic operation and control necessary for an operation of the server apparatus 100. The processor 11 controls the units based on a program such as system software, application software, or firmware stored in the main memory 12 or the auxiliary storage device 13 in order to implement various functions of the server apparatus 100. The processor 11 is, for example, a CPU (central processing unit) but is not limited to this. The processor 11 may be a multicore/multithread processor and can execute a plurality of kinds of processing in parallel. The processor 11 may be an MPU (micro processing unit). Further, the processor 11 may be implemented by other various forms including integrated circuits such as an ASIC (Application Specific Integrated Circuit), a GPU (Graphics Processing Unit), an FPGA (field-programmable gate array), a DSP (Digital Signal processor), an SoC (system on a chip), and a PLD (programmable logic device). The processor 11 may be a combination of a plurality of integrated circuits among these integrated circuits.

The processor 11 loads programs stored in the main memory 12 or the auxiliary storage device 13 in advance in the main memory 12. The programs include a control program for causing the processor 11 of the server apparatus 100 to implement units explained below. The processor 11 executes the programs loaded in the main memory 12 to execute various operations.

The main memory 12 is equivalent to a main storage part of the server apparatus 100. The main memory 12 includes a nonvolatile memory region and a volatile memory region. The main memory 12 stores an OS (Operating System) or programs in the nonvolatile memory region. The main memory 12 uses the volatile memory region as a work area where data is rewritten as appropriate by the processor 11. For example, the main memory 12 includes a ROM (Read Only Memory) as the nonvolatile memory region. For example, the main memory 12 includes a RAM (Random Access Memory) as the volatile memory region.

The auxiliary storage device 13 is equivalent to an auxiliary storage part of the server apparatus 100. For example, the auxiliary storage device 13 is an EEPROM (registered trademark) (Electric Erasable Programmable Read-Only Memory), a HDD (Hard Disc Drive), an SSD (Solid State Drive), or the like. The auxiliary storage device 13 stores the programs explained above, data used by the processor 11 in performing various kinds of processing, and data generated by the processing in the processor 11.

As one of the programs stored by the main memory 12 or the auxiliary storage device 13, there is a control program explained below. In general, transfer of a computer apparatus is performed in a state in which the programs such as the control program are stored in the main memory 12 or the auxiliary storage device 13. However, not only this, but the control program and the like transferred separately from the computer apparatus may be written in a writable storage device included in the computer apparatus according to operation of a user or the like. The transfer of the control program and the like can be performed by being recorded in a removable computer-readable storage medium or by communication via a communication network. A form of the computer-readable storage medium does not matter if the computer-readable storage medium can store programs and can be read by a device like a CD-ROM, a memory card, and the like. Functions obtained by installation or download of the programs may be implemented in cooperation with an OS or the like inside the device.

The communication interface 14 includes various interfaces for communicably connecting the server apparatus 100 to the image forming apparatuses 200 and the user terminals 300 via the network NW according to a predetermined communication protocol.

Note that a hardware configuration of the server apparatus 100 is not limited to the configuration explained above. The server apparatus 100 enables omission and change of the components explained above and addition of new components as appropriate.

Units configured in the auxiliary storage device 13 of the server apparatus 100 are explained. The auxiliary storage device 13 stores, for example, an image quality database 131 and an equipment database 132 and includes a printing job storage unit 133. Note that, in FIG. 3, "database" is abbreviated as "DB".

The image quality database 131 is a database for managing image quality information of the image forming apparatuses 200 and is a set of data records correlated with the registered image forming apparatuses 200. Therefore, the image quality database 131 includes a quality information record for each of the image forming apparatuses 200.

FIG. 4 is a schematic diagram illustrating an example of a data structure of a quality information record 1311 stored in the image quality database 131. The quality information record 1311 includes fields F11, F12, and the like.

In the field F11, an apparatus ID (identifier), which is a unique identification code, set for each of the image forming apparatuses 200 in order to identify the image forming apparatus 200 is set. The apparatus ID can be optionally set by an administrator of the server apparatus 100 if a new image forming apparatus 200 participates in the printing system. For example, the apparatus ID may be a name conforming to a predetermined naming rule, a type name or a unique number such as a serial number of the image forming apparatus 200, and the like and can also be any combination of the foregoing. The administrator can set the apparatus ID from a not-illustrated management terminal via the network NW or, if the server apparatus 100 includes an input and output device such as a keyboard or a display or is connectable to the input and output device, can set the apparatus ID using the input and output device. The apparatus ID may be automatically generated by the processor 11.

Image quality information is set in the field F12. The image quality information can be acquired from the image forming apparatus 200 by the communication interface 14. The image quality information is information indicating the quality of an image formed by the image forming apparatus 200 such as a density difference between images formed on the front side and the rear side of the image forming apparatus 200.

The equipment database 132 is a database for managing the image forming apparatuses 200 and the user terminals 300 and is a set of data records correlated with the registered image forming apparatuses 200 or user terminals 300. Therefore, the equipment database 132 includes an equipment information record for each of the image forming apparatuses 200 and the user terminals 300.

FIG. 5 is a schematic diagram illustrating an example of a data structure of an equipment information record 1321 stored in the equipment database 132. The equipment information record 1321 includes fields F21, F22, F23, F24, and the like.

In the field F21, an apparatus ID, which is a unique identification code, set for each of the image forming apparatuses 200 or the user terminals 300. As the apparatus ID of the image forming apparatus 200, the same identification code as the apparatus ID in the image quality database 131 is set. As in the case of the image forming apparatus 200, the apparatus ID of the user terminal 300 can be optionally set by the administrator of the server apparatus 100 if a new user terminal 300 participates in the printing system or can be automatically generated by the processor 11.

In the field F22, a network address such as an IP address of the image forming apparatus 200 or the user terminal 300 indicated by the apparatus ID is set.

In the field F23, installation position information of the image forming apparatus 200 or the user terminal 300 indicated by the apparatus ID is set. For the image forming apparatus 200, if the image forming apparatus 200 is installed in a print service station, the installation position information may be an address of the service station. If the image forming apparatus 200 is installed in a company, the installation position information may be not only a physical position such as a building or a floor but also a logical position such as a department or a rank. The installation position information can be set by the administrator of the server apparatus 100 if a new image forming apparatus 200 participates in the printing system. The same applies to installation position information of the user terminal 300.

However, if the user terminal 300 is a mobile terminal such as a notebook PC or a tablet terminal, the installation position information is not fixed but can be notified from the user terminal 300 and updated and set every time printing is performed. The notification of the installation position information may be included in a printing job as explained below or may be returned by inquiring the user terminal 300 about the installation position information in response to the reception of the printing job.

In the field F24, operation state information of the image forming apparatus 200 indicated by the apparatus ID is set. The operation state information indicates whether the image forming apparatus 200 is turned on and is in a printable state. The operation state information may be set according to power ON/OFF of the image forming apparatus 200 or according to information transmitted at every fixed time from the image forming apparatus 200 or may be set according to presence or absence of a replay by inquiring the image forming apparatus 200 about the operation state information at every fixed time from the server apparatus 100. In this embodiment, it is unnecessary to manage an operation state of the user terminal 300.

The printing job storage unit 133 is a storage unit that temporarily stores a printing job transmitted from the user terminal 300. The printing job is job information including, in addition to information indicating an image that should be formed, incidental information such as information indicating the user terminal 300 and information indicating the image forming apparatus 200 specified as a machine that performs printing. The incidental information may include installation position information of the user terminal 300.

Next, units implemented in the processor 11 of the server apparatus 100 are explained. The processor 11 is implemented with, for example, an image quality acquiring unit 111, an equipment information acquiring unit 112, a printing job unit receiving 113, an analyzing unit 114, a machine determining unit 115, and a printing job transmitting unit 116. The units implemented in the processor 11 can also be referred to as functions. The units implemented in the processor 11 can also be referred to as being implemented in a control unit including the processor 11 and the main memory 12. The equipment management server 101 can be implemented by the image quality acquiring unit 111 and the equipment information acquiring unit 112. The operation management server 102 can be implemented by the printing job receiving unit 113, the analyzing unit 114, the machine determining unit 115, and the printing job transmitting unit 116.

The image quality acquiring unit 111 acquires quality information from the image forming apparatuses 200 via the communication interface 14. The image quality acquiring unit 111 causes the image quality database 131 to store the acquired image quality information. Specifically, for example, the image quality acquiring unit 111 searches through the field F22 of the equipment information record 1321 of the equipment database 132 using, as a search key, a network address of the image forming apparatus 200 that transmitted the image quality information and acquires an apparatus ID set in the field F21 of the equipment information record 1321 found by the search. The image quality acquiring unit 111 searches through the field F11 of the quality information record 1311 of the image quality database 131 using the acquired apparatus ID as a search key and sets the acquired image quality information in the field F12 of the quality information record 1311 found by the search.

Note that, if the equipment information record 1321 in which the network address of the image forming apparatus

200 that transmitted the image quality information is set in the field F22 is not successfully found in the equipment database 132, the image quality acquiring unit 111 can notify a management terminal of the administrator of the server apparatus 100 via the communication interface 14 via the network NW or, if the server apparatus 100 includes or is connected to an input and output device, using the input and output device, that a new image forming apparatus 200 participated in the printing system. The image quality acquiring unit 111 stores the image quality information in a not-illustrated temporary storage region of the auxiliary storage device 13 until registration work for the new image forming apparatus 200 is carried out by the administrator and new records are added to the image quality database 131 and the equipment database 132. If new records are added to the image quality database 131 and the equipment database 132, the image quality acquiring unit 111 sets the stored image quality information in the field F12 of a new quality information record 1311. Rather than notifying the administrator, the image quality acquiring unit 111 may issue a new apparatus ID according to a predetermined rule and add new records to the image quality database 131 and the equipment database 132. If the new records are added to the image quality database 131 and the equipment database 132 in this way, the image quality acquiring unit 111 sets the issued apparatus ID in the field F11 of the added quality information record 1311 and sets the acquired image quality information in the field F12. The image quality acquiring unit 111 sets the issued apparatus ID in the field F21 of the added equipment information record 1321 and sets, in the field F22, the network address of the image forming apparatus 200 that transmitted the image quality information. Further, the image quality acquiring unit 111 sets, in the field F24 of the added equipment information record 1321, operation state information indicating that the image forming apparatus 200 is turned on and is in the printable state.

The equipment information acquiring unit 112 acquires equipment information from the image forming apparatuses 200 and the user terminals 300 via the communication interface 14. The equipment information acquiring unit 112 causes the equipment database 132 to store the acquired equipment information. Specifically, if acquiring operation state information from the image forming apparatus 200 as the equipment information, the equipment information acquiring unit 112 searches through the field F22 of the equipment information record 1321 of the equipment database 132 using a network address of the image forming apparatus 200, which is an acquisition source of the operation state information, as a search key and sets the acquired operation state information in the field F24 of the equipment information record 1321 found by the search. If acquiring installation position information from the user terminal 300 as the equipment information, the equipment information acquiring unit 112 searches through the field F22 of the equipment information record 1321 of the equipment database 132 using a network address of the user terminal 300, which is an acquisition source of the installation position information, as a search key and sets the acquired installation position information in the field F23 of the equipment information record 1321 found by the search.

Note that, if the equipment information record 1321 in which the network address of the image forming apparatus 200, which is the acquisition source of the equipment information, is set in the field F22 is not successfully found in the equipment database 132, like the image quality acquiring unit 111, the equipment information acquiring unit 112 can cause the image quality database 131 and the equipment database 132 to add new records. The equipment information acquiring unit 112 sets the acquired operation state information in the field F23 of a new equipment information record 1321 of the equipment database 132.

If the equipment information record 1321 in which the network address of the user terminal 300, which is the acquisition source of the equipment information, is set in the field F22 is not successfully found in the equipment database 132, the equipment information acquiring unit 112 notifies the administrator of the server apparatus 100 that a new user terminal 300 participated in the printing system and issues a new apparatus ID according to a predetermined rule to cause the equipment database 132 to add a new equipment information record 1321. The equipment information acquiring unit 112 sets the acquired installation position information in the field F23 of the new equipment information record 1321 of the equipment database 132.

The printing job receiving unit 113 receives, via the communication interface 14, a printing job transmitted from the user terminal 300. The printing job receiving unit 113 causes the printing job storage unit 133 to store the received printing job. Specifically, the printing job receiving unit 113 searches through the field F22 of the equipment information record 1321 of the equipment database 132 using a network address of the user terminal 300, which is a transmission source of the printing job, as a search key and acquires an apparatus ID stored in the field F21 of the equipment information record 1321 by the search. The printing job receiving unit 113 causes the printing job storage unit 133 to store the received printing job in association with the acquired apparatus ID.

Note that the equipment information acquiring unit 112 checks whether installation position information of the user terminal 300 is included, as incidental information, in the printing job stored in the printing job storage unit 133. If installation position information is included, as explained above, the equipment information acquiring unit 112 acquires the installation position information and sets the installation position information in the field F23 of the equipment information record 1321 corresponding thereto of the equipment database 132. If installation position information is not included, as explained above, the equipment information acquiring unit 112 can inquire the user terminal 300 at the transmission source of the printing job about installation position information and set the installation position information in the field F23 of the equipment information record 1321 corresponding thereto of the equipment database 132.

The analyzing unit 114 analyzes, from the printing job stored in the printing job storage unit 133, density in an image that should be formed.

The machine determining unit 115 determines, based on the density analyzed by the analyzing unit 114, the image quality information stored in the image quality database 131, and the installation position information stored in the equipment database 132, out of the plurality of image forming apparatuses 200, the image forming apparatus 200 used for printing indicated by the printing job.

Specifically, first, the machine determining unit 115 extracts a proper machine suitable for carrying out the printing job, that is, capable of printing, at high quality, an image that should be formed. The machine determining unit 115 carries out the extraction based on the density analyzed by the analyzing unit 114 and the image quality information set in the fields F12 of the quality information records 1311 of the image quality database 131. For example, the machine determining unit 115 checks a density difference between the analyzed densities for each piece of the image quality information of the image forming apparatus 200 and extracts, as the proper machine, the image forming apparatus 200 in which the density difference is small. The machine determining unit 115 acquires an apparatus ID of the extracted image forming apparatus 200, which is the proper machine, from the field F11 of the quality information record 1311.

Subsequently, the machine determining unit 115 checks the position of the user terminal 300, which is the transmission source of the printing job, according to the installation position information set in the field F23 of the equipment information record 1321 of the equipment database 132. The machine determining unit 115 checks a relation between the installation position information set in the field F23 of the quality information record 1311 in which the apparatus ID of the image forming apparatus 200 extracted as the proper machine is set in the field F21 and the checked position of the user terminal 300. If the relation between the installation position information and the position of the user terminal 300 matches a predetermined position condition, the machine determining unit 115 selects the image forming apparatus 200 as a machine in use.

Note that the predetermined position condition can be, for example, a physical condition such as a distance from a current position of the user terminal 300. Alternatively, the predetermined position condition may include a logical condition such as a relation between a department or a rank of the user of the user terminal 300 and an installation department or an installation position of the image forming apparatus 200. The administrator of the server apparatus 100 or the user of the user terminal 300 may be able to optionally set the position condition.

As explained above, the machine determining unit 115 can limit, for each of the user terminals 300, the plurality of image forming apparatuses 200 participating in the printing system and determine, as the machine in use to be used for the printing indicated by the printing job, the proper machine extracted out of the limited image forming apparatuses 200. Note that the number of image forming apparatuses 200 determined as the machine in use is not limited to one. A plurality of image forming apparatuses 200 may be present as machines in use. If the plurality of image forming apparatuses 200 are determined as the machine in use, the plurality of image forming apparatuses 200 may be ranked according to matching degrees to the position condition.

The printing job transmitting unit 116 transmits the printing job to the image forming apparatus 200, which is the machine in use determined by the machine determining unit 115, via the communication interface 14. If the machine in use determined by the machine determining unit 115 includes the plurality of image forming apparatuses 200, the printing job transmitting unit 116 can transmit the printing job to the image forming apparatus 200 ranked the highest. Note that printing job transmitting unit 116 notifies information indicating which is the image forming apparatus 200 at the transmission destination of the printing job to the user terminal 300 at the transmission source of the printing job via the communication interface 14.

In the printing system, there is a use form in which the user of the user terminal 300 at the transmission source of the printing job moves to an installation place of any image forming apparatus 200, receives a printing execution instruction from the control panel 216 of the image forming apparatus 200, and starts printing in the image forming apparatus 200. In such a case, the printing job transmitting unit 116 does not immediately transmit the printing job to the image forming apparatus 200 determined as the machine in use but waits for the printing execution instruction from any image forming apparatus 200 to be received by the communication interface 14. If receiving the printing execution instruction, the printing job transmitting unit 116 checks whether the image forming apparatus 200 is included in the determined machine in use and, if the image forming apparatus 200 is included in the determined machine in use, transmits the printing job to the image forming apparatus 200 via the communication interface 14.

In contrast, if the image forming apparatus 200 is not included in the determined machine in use, the printing job transmitting unit 116 recommends, to the user, not printing in the image forming apparatus 200 but printing by the determined machine in use. Specifically, the printing job transmitting unit 116 transmits information concerning the determined machine in use to the image forming apparatus 200 via the communication interface 14 to cause the control panel 216 of the image forming apparatus 200 to display the information. If receiving, via the communication interface 14, a selection result of the machine in use by operation of the control panel 216 of the user, the printing job transmitting unit 116 transmits the printing job to the selected image forming apparatus 200 via the communication interface 14. Note that, if the machine in use determined by the machine determining unit 115 includes a plurality of image forming apparatuses 200, the recommendation can present the plurality of image forming apparatuses 200 to the user. Consequently, the user can execute printing in a machine desired by the user among a plurality of machines in use.

If being turned on by operating a not-illustrated power switch, the control program starts and the server apparatus 100 having the configuration explained above executes information processing of the equipment management server 101 and the operation management server 102.

Equipment management processing, which is the information processing of the equipment management server 101, and operation management processing, which is the information processing of the operation management server 102, in the server apparatus 100 are explained in detail below.

Figure 6:
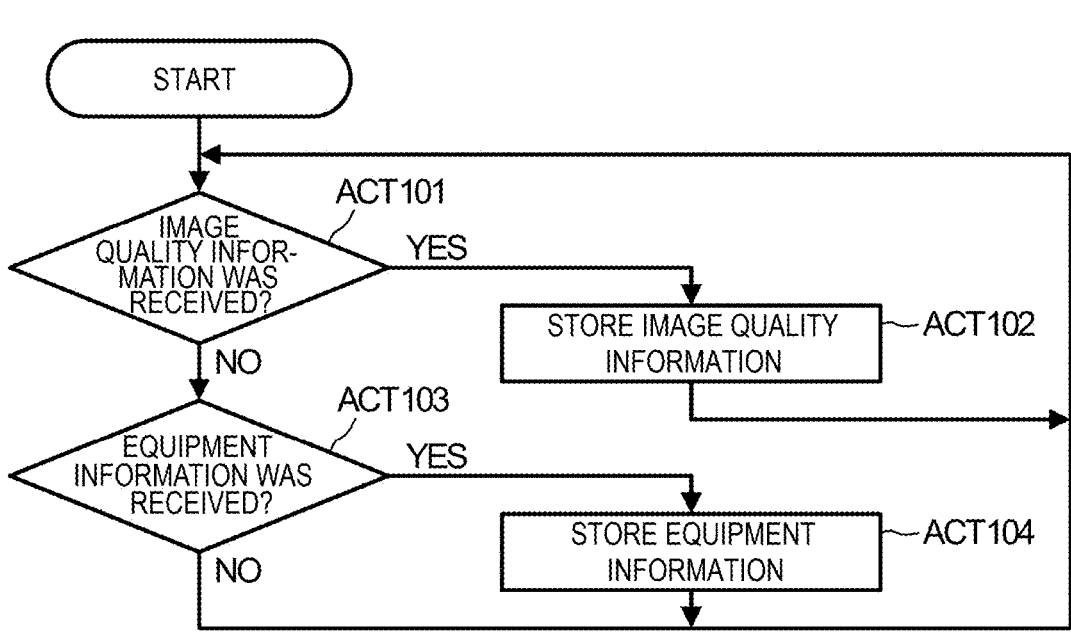
FIG. 6 is a flowchart illustrating an example of equipment management processing in the server apparatus.

FIG. 6 is a flowchart illustrating an example of the equipment management processing in the server apparatus 100 according to this embodiment. Note that content of the processing illustrated in FIG. 6 and explained blow is an example. Various kinds of processing capable of obtaining the same results can be used as appropriate. The processor 11 executes the processing based on the control program stored in the main memory 12 or the auxiliary storage device 13. Note that, here, it is assumed that, for each of the image forming apparatuses 200 and the user terminals 300 participating in the printing system, data records in which apparatus IDs are set were already registered in the image quality database 131 and the equipment database 132.

In ACT 101, the processor 11 of the server apparatus 100 operates as the image quality acquiring unit 111 and determines whether image quality information transmitted from any image forming apparatus 200 was received by the communication interface 14.

By scanning reference paper with the scan unit 214 at any point in time, the image forming apparatus 200 can generate image quality information indicating the quality of an image formed by the image forming unit 205 of the image forming apparatus 200 and transmit the generated image quality information to the server apparatus 100 via the network NW. The reference paper is an original document on which a monochrome reference image having gradations is formed in a sub-scanning direction of the image forming apparatus 200, that is, a sub-scanning direction of the scan unit 214 and the image forming unit 205. The color of the reference image corresponds to a color of the image formed by the image forming unit 205. If the image forming apparatus 200 is, for example, an image forming apparatus that forms a monochrome image having one color of black, since the image forming apparatus includes only the image forming unit 205 for the one color of black, one reference paper is enough. In contrast, for the image forming apparatus 200 including the four image forming units 205, that is, the image forming unit 2051, the image forming unit 2052, the image forming unit 2053, and the image forming unit 2054 for the four colors of CMYK illustrated in FIG. 2, four reference papers on which images of the respective colors CMYK are formed are used.

Figure 7:
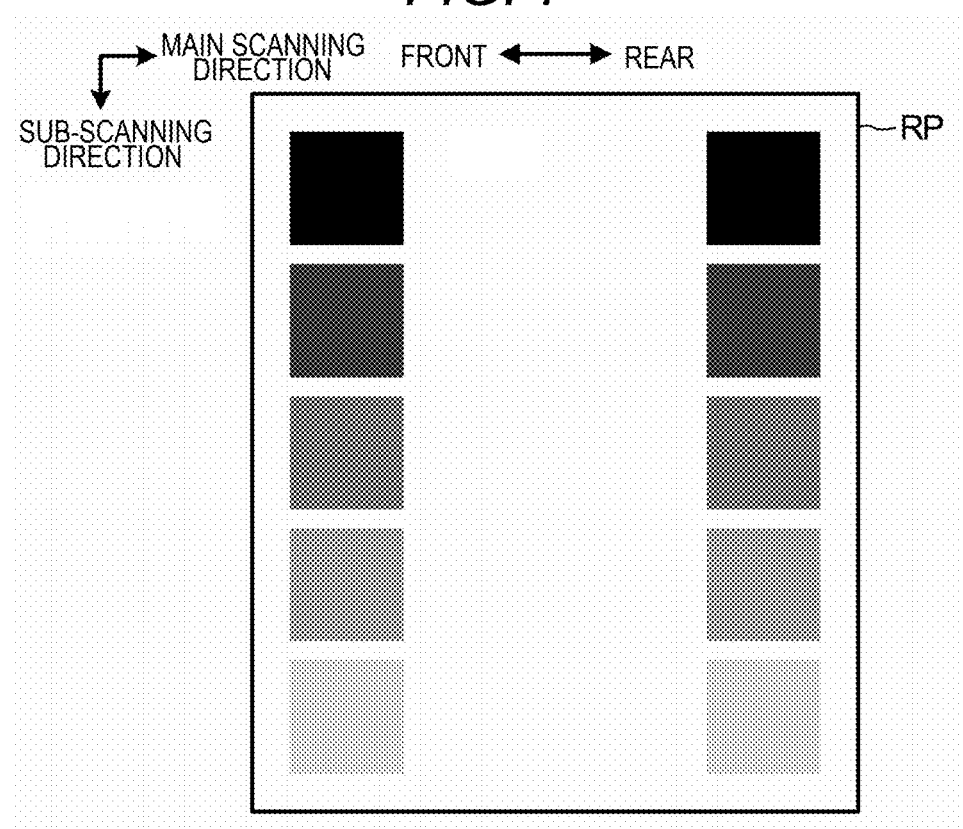
FIG. 7 is a diagram illustrating an example of reference paper.

FIG. 7 is a diagram illustrating an example of reference paper RP. In this example, on the reference paper RP, monochrome reference images having gradations in the sub-scanning direction are formed in each of two separated positions on the front side and the rear side in the front-rear direction of the image forming apparatus 200, which is the main scanning direction of the scan unit 214 and the image forming unit 205. That is, the reference images are images in which two rows of a plurality of rectangular images arrayed to be separated in the sub-scanning direction and having different densities are arranged to be separated in the main scanning direction.

A manufacturer or a seller of the image forming apparatus 200 or an administrator of the printing system prepares the reference paper RP by forming such reference images on reference paper using an image forming apparatus having high quality serving as a reference. For example, the prepared reference paper RP can be distributed to servicepersons who carry out maintenance and inspection of the image forming apparatus 200 and can be attached to the image forming apparatus 200. Alternatively, the image forming apparatuses 200 may form reference images common to all the image forming apparatuses on reference paper prepared in advance to prepare the reference paper RP. A service person or the user of the image forming apparatus 200 causes the scan unit 214 of the image forming apparatus 200 to read the reference images on the prepared reference paper RP at any point in time such as an installation time or a maintenance time of the image forming apparatus 200 or a replacement time of the toner cartridge 204. Consequently, the image forming apparatus 200 transmits a reading result of the reference images to the server apparatus 100 as image quality information.

Referring back to FIG. 6, based on the determination that the image quality information was received (YES in ACT 101), in ACT 102, the processor 11 causes the image quality database 131 to store the received image quality information. Specifically, the processor 11 acquires an apparatus ID from the equipment database 132 based on a network address of the image forming apparatus 200 that transmitted the image quality information and sets the image quality information in the quality information record 1311 of the image quality database 131 corresponding to the apparatus ID. Thereafter, the processor 11 shifts to the processing operation in ACT 101 explained above.

Based on the determination that the image quality information was not received (NO in ACT 101), in ACT 103, the processor 11 operates as the equipment information acquiring unit and 112 determines whether equipment information transmitted from any image forming apparatus 200 or any user terminal 300 was received by the communication interface 14. The processor 11 shifts to the processing operation in ACT 101 based on the determination that the equipment information was not received (NO in ACT 103).

In contrast, based on the determination that the equipment information was received (YES in ACT 103), in ACT 104, the processor 11 causes the equipment database 132 to store the received equipment information. Specifically, if receiving operation state information as the equipment information, the processor 11 sets, based on a network address of the image forming apparatus 200 that transmitted the operation state information, the received operation state information in the equipment information record 1321 corresponding to thereto of the equipment database 132. If receiving installation position information from the user terminal 300 as the equipment information, the processor 11 sets, based on a network address of the user terminal 300 that transmitted the installation position information, the received installation information in the equipment information record 1321 corresponding thereto of the equipment database 132. Thereafter, the processor 11 shifts to the processing operation in ACT 101 explained above.

Figure 9:
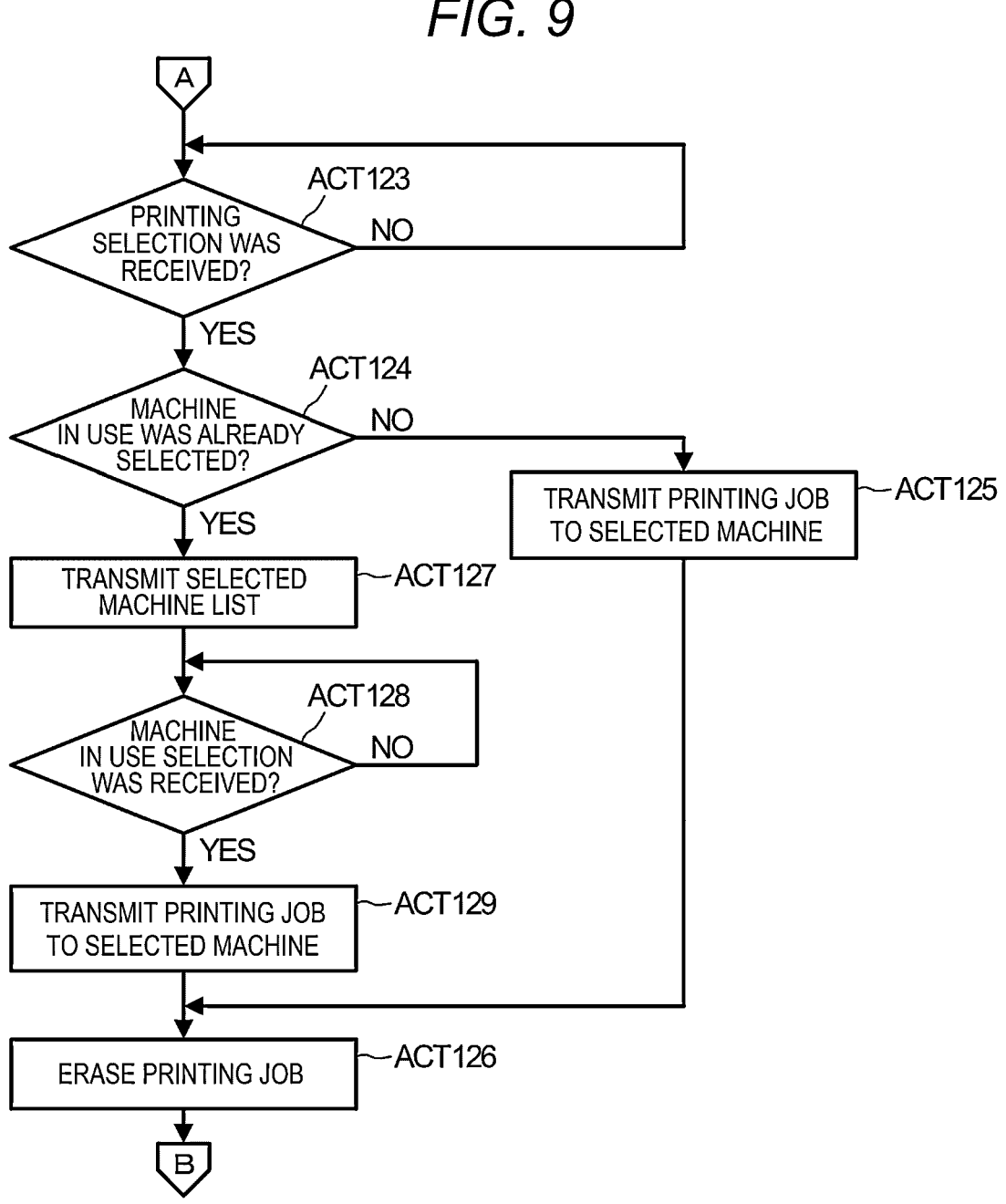
FIG. 9 is a diagram illustrating a second portion of the series of flowcharts illustrating the example of the operation management processing in the server apparatus according to the first embodiment.

FIGS. 8 and 9 are a series of flowcharts illustrating an example of operation management processing in the server apparatus 100 according to this embodiment. Note that content of processing illustrated in FIGS. 8 and 9 and explained below is an example. Various kinds of processing capable of obtaining the same results can be used as appropriate. The processor 11 executes the processing based on the control program stored in the main memory 12 or the auxiliary storage device 13. The processor 11 can simultaneously execute the processing and the equipment management processing illustrated in FIG. 6 in parallel. Note that, unless particularly explained otherwise, the processing of the processor 11 shifts to ACT(n+1) after ACTn (n is a natural number).

In ACT 111, the processor 11 of the server apparatus 100 operates as the printing job receiving unit 113 and determines whether a printing job transmitted from any user terminal 300 was received. Based on the determination that the printing job was not received (NO in ACT 111), the processor 11 repeats the processing operation in ACT 111. That is, the processor 11 continues the processing operation in ACT 111 until determining that the printing job was received. The processor 11 can be referred to as waiting for the printing job to be received.

Based on the determination that the printing job was received (YES in ACT 111), in ACT 112, the processor 11 causes the printing job storage unit 133 to store the received printing job. Specifically, the processor 11 acquires, based on a network address of the user terminal 300, which is a transmission source of the printing job, an apparatus ID of the user terminal 300 at the transmission source from the equipment database 132 and causes the printing job storage unit 133 to store the received printing job in association with the apparatus ID.

In ACT 113, the processor 11 operates as the analyzing unit 114, analyzes the printing job stored in the printing job storage unit 133, and determines whether the same monochrome density parts are present on the front side and the rear side in an image that should be formed on one piece of paper. The processor 11 executes the determination for each of the colors of the image forming units 205. Based on the determination that the same monochrome density parts are absent (NO in ACT 113), the processor 11 shifts to a processing operation in ACT 117 explained below.

In contrast, based on the determination that the same monochrome density parts are present (YES in ACT 113), in ACT 114, the processor 11 analyzes the densities of the same monochrome density parts from the printing job stored in the printing job storage unit 133.

In ACT 115, the processor 11 operates as the machine determining unit 115 and extracts a proper machine out of the plurality of image forming apparatuses 200 based on the densities analyzed in ACT 114 and the image quality information stored in the image quality database 131. Specifically, for the densities of the monochrome density parts analyzed in ACT 114, the processor 11 checks a density difference in separated positions of two parts on the front side and the rear side indicated by the image quality information of the image forming apparatuses 200 stored in the image quality database 131. The processor 11 extracts, as the proper machine, the image forming apparatus 200 in which the density difference is small, that is, equal to or smaller than a specified density difference. Here, in most cases, a plurality of image forming apparatuses 200 are extracted as proper machines.

In ACT 116, the processor 11 selects a machine in use out of the plurality of image forming apparatuses 200 extracted as the proper machines in ACT 115. The processor 11 carries out the selection of the machine in use based on the installation position information stored in the equipment database 132. Specifically, the processor 11 narrows down the image forming apparatuses 200, operation states of which stored in the equipment database 132 indicate a printable state, among the image forming apparatuses 200 extracted as the proper machines. The processor 11 checks, according to the installation position information stored in the equipment database 132, installation positions of the narrowed down image forming apparatuses 200 and an installation position of the user terminal 300, which is the transmission source of the printing job. The processor 11 selects, as the machine in use, the image forming apparatus 200, a relation between the installation position of which and the installation position of the user terminal 300 matches a predetermined position condition.

As explained above, the processor 11 limits, for each of the user terminals 300, the plurality of image forming apparatuses 200 participating in the printing system and determines the proper machine extracted out of the limited image forming apparatuses 200 as the machine in use to be used for printing indicated by the printing job. The processor 11 stores information, for example, an apparatus ID indicating the selected, that is, determined machine in use in the volatile memory region of the main memory 12. Note that a plurality of image forming apparatuses 200 may be determined as machines in use. The processor 11 can rank the plurality of machines in use according to matching degrees to the position condition.

In ACT 117, the processor 11 operates as the printing job transmitting unit 116 and determines whether a machine in use was already specified. Specifically, the processor 11 determines whether the printing job stored in the printing job storage unit 133 includes information for designating the image forming apparatus 200 that performs printing. For example, it is possible that the image forming apparatus 200 used for printing by the user is designated in the user terminal 300 or the image forming apparatus 200 to be used is set for each of the user terminals 300 in advance. Based on the determination that the machine in use was not specified yet (NO in ACT 117), the processor 11 shifts to a processing operation in ACT 123 explained below.

In contrast, based on the determination that the machine in use was already specified (YES in ACT 117), in ACT 118, the processor 11 determines whether the machine in use was already selected in ACT 116. Specifically, the processor 11 determines whether the machine in use is stored in the volatile memory region of the main memory 12.

Based on the determination that the machine in use was not selected yet (NO in ACT 118), in ACT 119, the processor 11 transmits, via the communication interface 14, the printing job to the image forming apparatus 200, which is a specified machine specified as the machine in use in the printing job.

In ACT 120, the processor 11 erases the transmitted printing job from the printing job storage unit 133. Thereafter, the processor 11 shifts to the processing operation in ACT 111 explained above.

Based on the determination that the machine in use was already selected (YES in ACT 118), in ACT 121, the processor 11 transmits, via the communication interface 14, the printing job to the image forming apparatus 200, which is the selected machine stored in the main memory 12 as the machine in use. Note that, if a plurality of machines in use are stored in the main memory 12, the processor 11 sets, as the selected machine, a machine in use ranked the highest among the stored machines in use.

In ACT 122, the processor 11 notifies, via the communication interface 14, printing destination information indicating which is the image forming apparatus 200 at a transmission destination of the printing job, that is, in which image forming apparatus 200 printing was executed. A notification destination of the printing destination information may be, for example, the image forming apparatus 200, which is the specified machine specified as the machine in use in the printing job. The image forming apparatus 200 that received the notification of the printing destination information can present, with the control panel 216, to a user who comes to pick up printed paper, a message to the effect that, since proper printing cannot be performed in the image forming apparatus 200, printing is performed in the image forming apparatus 200 indicated by the printing destination information. Alternatively, the notification destination may be the user terminal 300 at the transmission source of the printing job. The user terminal 300 can present the image forming apparatus 200 at the printing destination to the user according to the printing destination information. Naturally, the printing destination information may be notified to both of the image forming apparatus 200, which is the specified machine, and the user terminal 300 at the transmission source of the printing job. Thereafter, the processor 11 shifts to the processing operation in ACT 120 explained above.

Based on the determination that the machine in use was not specified yet (NO in ACT 117), in ACT 123, the processor 11 determines whether printing selection information was received from any image forming apparatus 200 by the communication interface 14. For example, if the machine in use is not specified, the user of the user terminal 300, which is the transmission source of the printing job, operates the control panel 216 of any image forming apparatus 200 to instruct execution of the printing job in the image forming apparatus 200. Note that, at that time, if there are a plurality of printing jobs, the user can select a printing job to be executed. In order to execute the printing job selected by the user, the image forming apparatus 200 transmits printing selection information indicating the selected printing job to the server apparatus 100. Based on the determination that the printing selection information was not received (NO in ACT 123), the processor 11 of the server apparatus 100 repeats the processing operation in ACT 123. That is, the processor 11 continues the processing operation in ACT 123 until determining that the printing selectin information was received. The processor 11 is also referred to as waiting for the printing selection information to be received.

Based on the determination that the printing selection information was received (YES in ACT 123), in ACT 124, the processor 11 determines whether the machine in use was already selected in 1 ACT 116. Specifically, the processor 11 determines whether the machine in use is stored in the volatile memory region of the main memory 12.

Based on the determination that the machine in use was not selected yet (NO in ACT 124), in ACT 125, the processor 11 transmits, via the communication interface 14, the printing job stored in the printing job storage unit 133 to the image forming apparatus 200, which is the selected machine indicated by the printing selection information received in ACT 123.

In ACT 126, the processor 11 erases the transmitted printing job from the printing job storage unit 133. Thereafter, the processor 11 shifts to the processing operation in ACT 11 explained above.

Based on the determination that the machine in use was already selected (YES in ACT 124), the processor 11 transmits, via the communication interface 14, a list of one or more selected machines stored in the main memory 12 as machines in use to the image forming apparatus 200, which is a transmission source of the printing selection information received in ACT 123. The image forming apparatus 200 that receives the list of the selected machines can display the list on the control panel 216 and because an appropriate printing is not performed by the image forming apparatus, display a message for requesting to select an image forming apparatus to be used for printing from the list. The image forming apparatus 200 receives selection operation for the image forming apparatus and returns machine in use election information corresponding to the selection operation to the server apparatus 100.

In ACT 128, the processor 11 determines whether the machine in use selection information was received from the image forming apparatus 200, which is a transmission destination of the list of the selected machines, by the communication interface 14. Based on the determination that the machine in use selection information was not received (NO in ACT 128), the processor 11 repeats the processing operation in ACT 128. That is, the processor 11 continues the processing operation in ACT 128 until determining that the machine in use selection information was received. The processor 11 can also be considered as waiting for the machine in use selection information to be received.

Based on the determination that the machine in use selection information was received (YES in ACT 128), in ACT 129, the processor 11 transmits, via the communication interface 14, the printing job stored in the printing job storage unit 133 to the image forming apparatus 200, which is the selected machine indicated by the machine in use selection information. Note that, thereafter, the processor 11 shifts to the processing operation in ACT 126 explained above.

Figure 10:
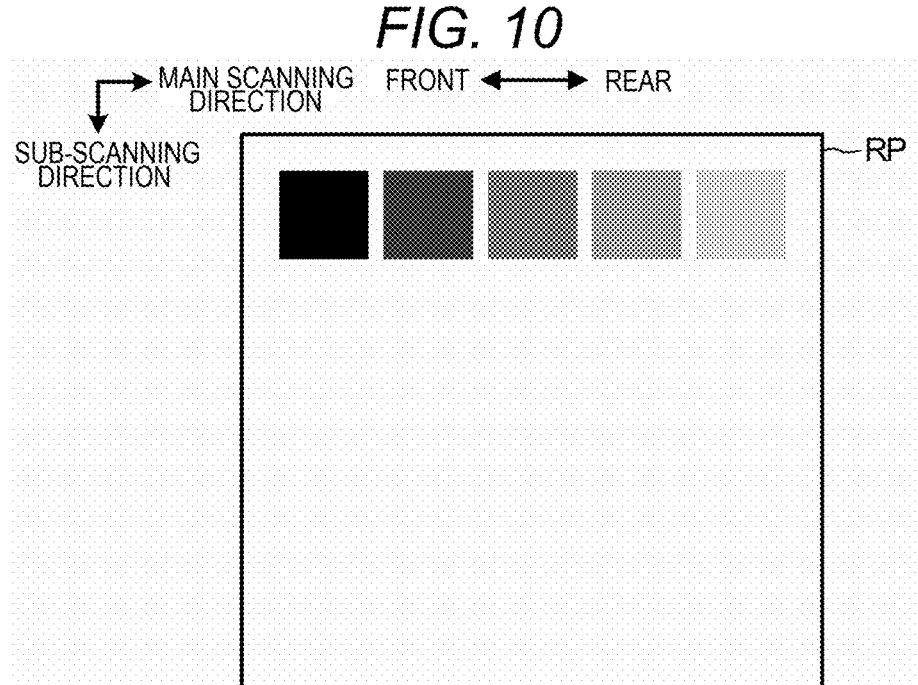
FIG. 10 is a diagram illustrating an example of the reference paper.
Figure 11:
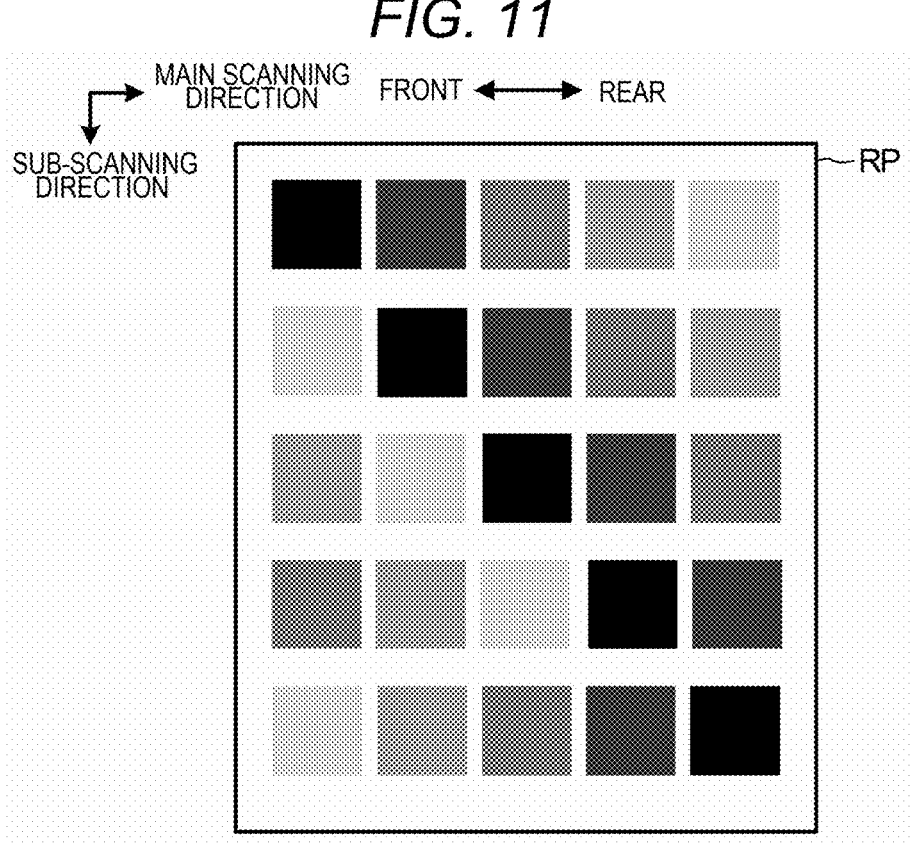
FIG. 11 is a diagram illustrating an example of the reference paper.

Note that the reference paper RP used to acquire image quality information is not limited to the reference paper RP illustrated in FIG. 7. For example, as illustrated in FIG. 10, the reference paper RP may be the reference paper RP on which a monochrome reference image having gradations in the main scanning direction is formed in each of separated positions in two parts in the left-right direction of the image forming apparatus 200, which is the sub-scanning direction of the scan unit 214 and the image forming unit 205. Further, as illustrated in FIG. 11, the reference paper RP may be the reference paper RP on which a monochrome reference image having gradations in the sub-scanning direction is formed in each of separated positions in at least two parts, in this example, five parts in the front-rear direction of the image forming apparatus 200, which is the main scanning direction, and the left-right direction of the image forming apparatus 200, which is the sub-scanning direction.

Figure 12:
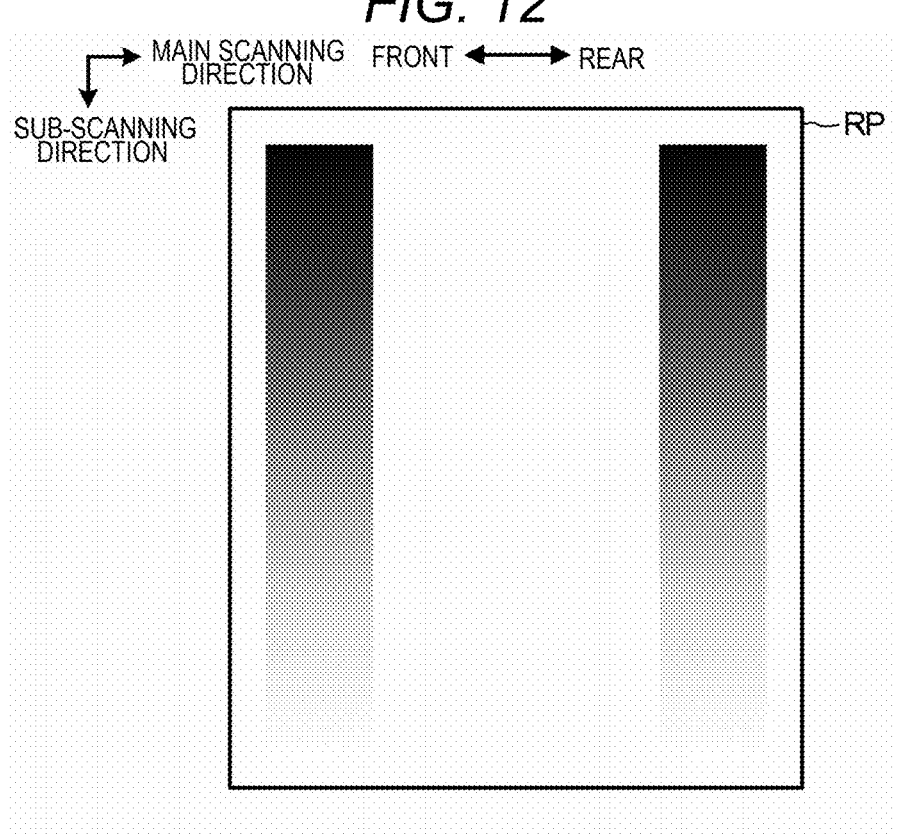
FIG. 12 is a diagram illustrating an example of the reference paper.
Figure 13:
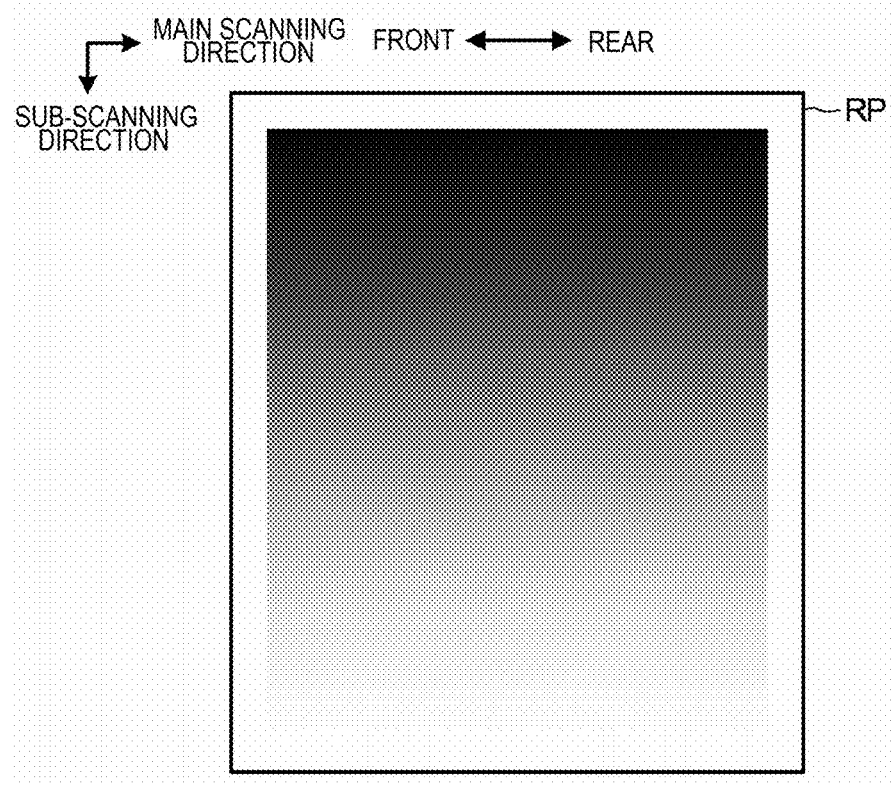
FIG. 13 is a diagram illustrating an example of the reference paper.

In the reference paper RP illustrated in FIG. 7, the reference images are the reference images in which the two rows of the plurality of rectangular images arrayed to be separated in the sub-scanning direction and having the different densities are arrayed to be separated in the main scanning direction. However, as illustrated in FIG. 12, the reference images may be reference images in which two images having gradations respectively linearly changing in the sub-scanning direction are arranged to be separated in the main scanning direction. As illustrated in FIG. 13, the reference paper RP may be the reference paper RP on which images having the same density continuing in the main scanning direction and gradations linearly changing in the sub-scanning direction are the reference images. In this case, the reading results in the two parts in the front-rear direction of the image forming apparatus 200, which is the main scanning direction, in the scanned and read reference images are set as the image quality information. Consequently, the same image quality information as the image quality information obtained if the reference paper RP illustrated in FIG. 7 is used is obtained.

As explained above, in the server apparatus 100 according to this embodiment that communicates with, via the network NW, the plurality of image forming apparatuses 200 including the scan units 214 that respectively provide the scan functions and the user terminal 300 that provides an image that should be formed in any one of the plurality of image forming apparatuses 200, the processor 11 operates as the printing job receiving unit 113, receives the printing job, which is the job information indicating the image that should be formed transmitted by the user terminal 300, and causes the printing job storage unit 133 to store the received printing job. In this way, the processor 11 functions as a receiving unit. The processor 11 operates as the analyzing unit 114 and analyzes, from the printing job stored in the printing job storage unit 133, density in the image that should be formed. In this way, the processor 11 functions as an analyzing unit. The processor 11 functions as the machine determining unit 115 and determines, based on the analyzed density and the image quality information of each of the plurality of image forming apparatuses 200 obtained by scanning, in each of the plurality of image forming apparatuses 200, the reference paper RP on which the monochrome reference images having the gradations in the second direction orthogonal to the first direction are formed in the separated positions in the at least two parts in the first direction, the proper machine suitable for forming the image indicated by the printing job out of the plurality of image forming apparatuses 200. In this way, the processor 11 functions as a determining unit.

As explained above, in the server apparatus 100 according to this embodiment, the processor 11 determines the proper machine suitable for forming the image indicated by the printing job out of the plurality of image forming apparatuses 200 by checking, using the image quality information obtained by reading the reference paper RP, on which reference images are formed, with the scan unit 214 having the image reading performance corresponding to image forming performance of the image forming unit 205 of the image forming apparatus 200, whether the image forming apparatus 200 has image forming performance suitable for forming the image indicated by the printing job. Accordingly, the server apparatus 100 can determine the image forming apparatus 200 that can meet a high-quality printing request of the user.

Here, in each of the plurality of image forming apparatuses 200, the first direction and the second direction are the same direction in the scan of the scan unit 214 and the image formation of the image forming unit 205. The processor 11 analyzes whether the same monochrome density parts are present in separated positions of at least two parts in the first direction of the image forming unit 205 corresponding to separated positions of at least two parts in the first direction of the scan unit 214 in the image that should be formed and, if the same monochrome density parts are present, determines the proper machine.

Accordingly, the server apparatus 100 according to this embodiment carries out processing for determining a proper machine only if high-quality printing in which the same monochrome density parts are present in separated positions of two parts in the first direction is necessary and does not carry out the processing in other cases. Therefore, it is possible to omit useless processing.

Note that the processor 11 determines, out of the plurality of image forming apparatuses 200, as the proper machine, a machine in which a density difference between the densities of the same monochrome density parts is small in the separated positions of the at least two parts in the first direction of the image forming unit 205.

Accordingly, the server apparatus 100 according to this embodiment can determine, as the proper machine, the image forming apparatus 200 that has a small density difference between the same monochrome density parts in the separated positions of the at least two parts in the first direction and can implement high-quality printing.

Here, the first direction is the main scanning direction of the scan and the image formation and the second direction is the sub-scanning direction of the scan and the image formation.

Accordingly, the server apparatus 100 according to this embodiment can determine a proper machine suitable for forming an image in which the same monochrome density parts are present in separated positions of two parts on, for example, the front side and the rear side in the main scanning direction.

The processor 11 determines the proper machine out of the image forming apparatuses 200 limited as the machines in use by the user terminal 300 among the plurality of image forming apparatuses 200.

Accordingly, the server apparatus 100 according to this embodiment can limit a range of the image forming apparatus 200 determined as the proper machine. Therefore, it is possible to determine a proper machine more suitable for the user. For example, the server apparatus 100 can limit, based on the position information stored in the equipment database 132, the image forming apparatus 200 usable by the user of the user terminal 300.

The server apparatus 100 according to this embodiment further includes the image quality database 131 functioning as a storage unit that stores image quality information acquired by each of the plurality of image forming apparatuses 200.

Accordingly, the server apparatus 100 according to this embodiment can easily determine a proper machine by collectively managing image quality information of the plurality of image forming apparatuses 200.

In the server apparatus 100 according to this embodiment, the processor 11 operates as the printing job transmitting unit 116 and transmits the printing job, which is the job information, stored in the printing job storage unit 133 to the image forming apparatus 200 determined as the proper machine. In this way, the processor 11 functions as a transmitting unit.

Accordingly, the server apparatus 100 according to at least one embodiment is capable of causing the image forming apparatus 200 determined as the proper machine to execute the printing job and obtaining a printing result meeting a high-quality printing request of the user.

In the server apparatus 100 according to this embodiment, the processor 11 operates as the printing job transmitting unit 116 and transmits a determination result indicating the image forming apparatus 200 determined as the proper machine to an external apparatus. In this way, the processor 11 functions as a transmitting unit.

Accordingly, the server apparatus 100 according to this embodiment can present a determination result indicating which image forming apparatus 200 is the proper machine to the external apparatus such as the user terminal 300, which is the transmission source of the printing job.

The external apparatus includes an image forming apparatus operated by a user who uses a user terminal, which is a transmission source of a printing job, which is job information. The processor 11 transmits, according to selection operation for the image forming apparatus 200 determined as the proper machine from the image forming apparatus 200 operated by the user, the printing job, which is the job information, to the selected image forming apparatus 200.

Accordingly, the server apparatus 100 according to this embodiment can cause a user viewing the proper machine presented to an image forming apparatus operated by the user to select the image forming apparatus 200 used for actual printing.

Second Embodiment

The server apparatus 100 according to the first embodiment includes two virtual server functions of the equipment management server 101 and the operation management server 102. The two virtual server functions may be implemented by two physically separated server apparatuses.

Figure 14:
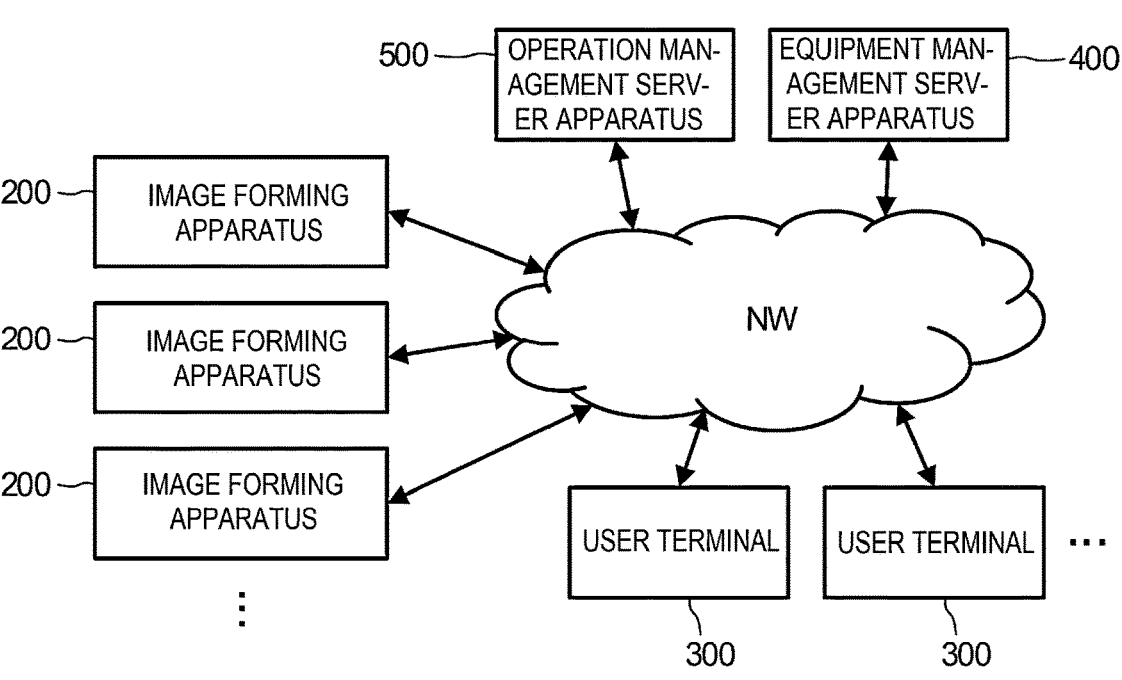
FIG. 14 is a schematic configuration diagram of a printing system including an equipment management server apparatus and an operation management server apparatus functioning as a server apparatus according to a second embodiment.

FIG. 14 is a schematic configuration diagram of a printing system including an equipment management server apparatus 400 and an operation management server apparatus 500 functioning as the server apparatuses according to the second embodiment. The equipment management server apparatus 400 corresponds to the equipment management server 101 and can be, for example, a server apparatus operated by a maintenance and inspection company that carries out maintenance and inspection of the image forming apparatus 200. The operation management server apparatus 500 corresponds to the operation management server 102 and can be, for example, a server apparatus or an inhouse server apparatus operated by a print service company.

Figure 15:
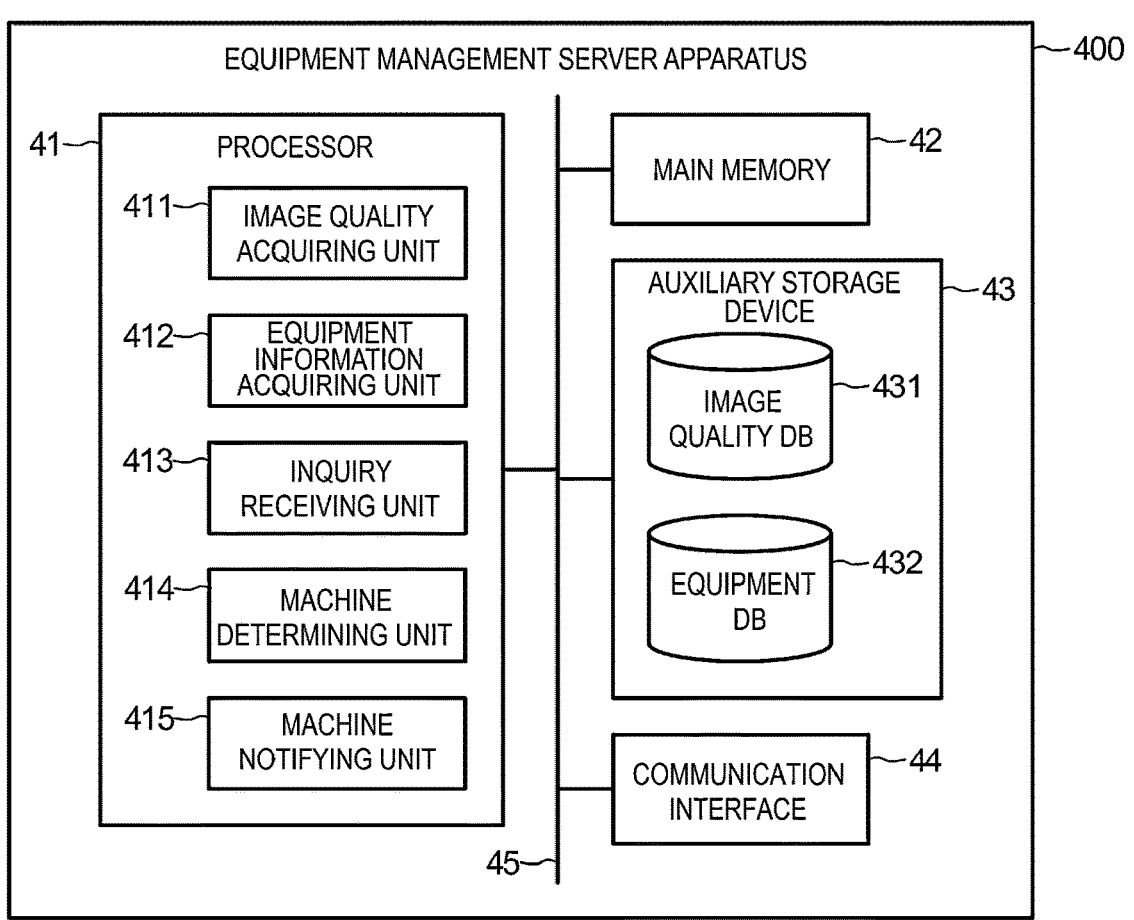
FIG. 15 is a block diagram illustrating an example of a circuit configuration of the equipment management server apparatus.

FIG. 15 is a block diagram illustrating an example of a circuit configuration of the equipment management server apparatus 400. As an example, the equipment management server apparatus 400 includes a processor 41, a main memory 42, an auxiliary storage device 43, and a communication interface 44. The main memory 42, the auxiliary storage device 43, and the communication interface 44 are connected to the processor 41 by a bus line 45 such as an address bus or a data bus. The processor 41, the main memory 42, the auxiliary storage device 43, the communication interface 44, and the bus line 45 have the same hardware configurations as the hardware configurations of the processor 11, the main memory 12, the auxiliary storage device 13, the communication interface 14, and the bus line 15 of the server apparatus 100 according to the first embodiment.

Here, units configured in the auxiliary storage device 43 of the equipment management server apparatus 400 are explained. The auxiliary storage device 43 stores, for example, an image quality database 431 and an equipment database 432. Note that, in FIG. 15, "database" is abbreviated as "DB".

The image quality database 431 is a database for managing image quality information of the image forming apparatuses 200 and is a set of data records correlated with the registered image forming apparatuses 200. The image quality database 431 is the same as the image quality database 131 in the server apparatus 100 according to the first embodiment. Accordingly, detailed explanation of the image quality database 431 is omitted.

The equipment database 432 is a database for managing the image forming apparatuses 200 and the user terminals 300 and is a set of data records correlated with the registered image forming apparatuses 200 or user terminals 300. The equipment database 432 is the same as the equipment database 132 in the server apparatus 100 according to the first embodiment. Accordingly, detailed explanation of the equipment database 432 is omitted.

Next, units implemented in the processor 41 of the equipment management server apparatus 400 are explained. The processor 41 is implemented with, for example, an image quality acquiring unit 411, an equipment information acquiring unit 412, an inquiry receiving unit 413, a machine determining unit 414, and a machine notifying unit 415. The units implemented in the processor 41 can also be referred to as functions. The units implemented in the processor 41 can also be referred to as being implemented in a control unit including the processor 41 and the main memory 42.

The image quality acquiring unit 411 acquires, via the communication interface 44, quality information image transmitted from the image forming apparatuses 200 and causes the image quality database 431 to store the image quality information. The image quality acquiring unit 411 is the same as the image quality acquiring unit 111 in the server apparatus 100 according to the first embodiment. Accordingly, detailed explanation of the image quality acquiring unit 411 is omitted.

The equipment information acquiring unit 412 acquires, via the communication interface 44, equipment information transmitted from the image forming apparatuses 200 and the user terminals 300 and causes the equipment database 432 to store the equipment information. The equipment information acquiring unit 412 is the same as the equipment information acquiring unit 112 in the server apparatus 100 according to the first embodiment. Accordingly, detailed explanation of the equipment information acquiring unit 412 is omitted.

The inquiry receiving unit 413 receives an inquiry transmitted from the operation management server apparatus 500 via the network NW. The inquiry can include an apparatus ID of the user terminal 300, which is a transmission source of a printing job, and density information indicating density in an image that should be formed analyzed from the printing job. The inquiry receiving unit 413 communicates the received inquiry to the machine determining unit 414.

The machine determining unit 414 determines, based on content of the inquiry received by the inquiry receiving unit 413, the image quality information stored in the image quality database 431, and the installation position information stored in the equipment database 432, a machine in use to be used for printing indicated by the printing job out of the plurality of image forming apparatuses 200. The machine determining unit 414 is the same as the machine determining unit 115 in the server apparatus 100 according to the first embodiment. Accordingly, detailed explanation of the machine determining unit 414 is omitted.

The machine notifying unit 415 notifies machine in use information indicating the image forming apparatus 200 determined as the machine in use by the machine determining unit 414 to the operation management server apparatus 500 via the communication interface 44. The machine in use information can include an apparatus ID and a network address of the image forming apparatus 200 determined as the machine in use.

Figure 16:
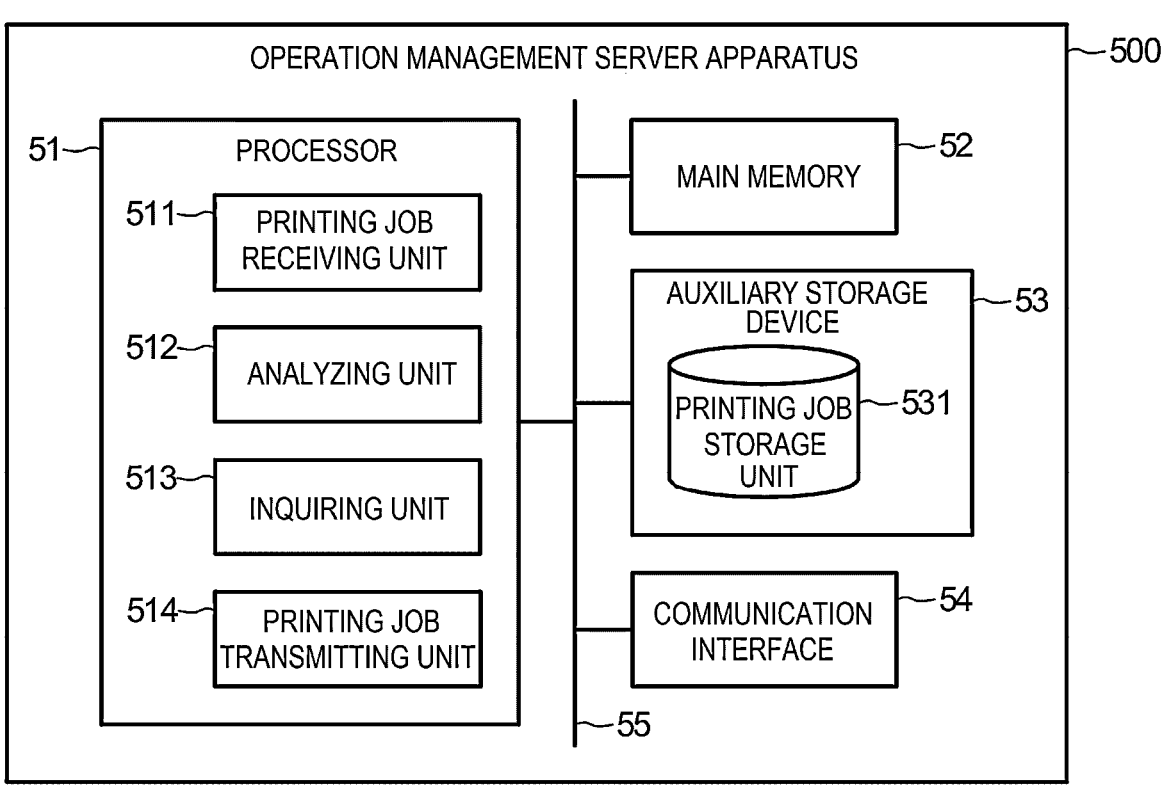
FIG. 16 is a block diagram illustrating an example of a circuit configuration of the operation management server apparatus.

FIG. 16 is a block diagram illustrating an example of a circuit configuration of the operation management server apparatus 500. As an example, the operation management server apparatus 500 includes a processor 51, a main memory 52, an auxiliary storage device 53, and a communication interface 54. The main memory 52, the auxiliary storage device 53, and the communication interface 54 are connected to the processor 51 by a bus line 55 such as an address bus or a data bus. The processor 51, the main memory 52, the auxiliary storage device 53, the communication interface 54, and the bus line 55 have the same hardware configurations as the hardware configurations of the processor 11, the main memory 12, the auxiliary storage device 13, the communication interface 14, and the bus line 15 in the server apparatus 100 according to the first embodiment.

Here, units configured in the auxiliary storage device 53 of the operation management server apparatus 500 are explained. The auxiliary storage device 53 includes, for example, a printing job storage unit 531. The printing job storage unit 531 is a storage unit that temporarily stores a printing job transmitted from the user terminal 300. The printing job is information job including incidental information such as information indicating an image that should be formed, information indicating the user terminal 300, information indicating the image forming apparatus 200 specified as a machine that performs printing, and installation position information of the user terminal 300.

Next, units implemented in the processor 51 of the operation management server apparatus 500 are explained. The processor 51 is implemented with, for example, a printing job receiving unit 511, an analyzing unit 512, an inquiring unit 513, and a printing job transmitting unit 514. The units implemented in the processor 51 can also be referred to as functions. The units implemented in the processor 51 can also be referred to as being implemented in a control unit including the processor 51 and the main memory 52.

The printing job receiving unit 511 receive, via the communication interface 54, a printing job transmitted from the user terminal 300 and causes the printing job storage unit 531 to store the printing job. The printing job receiving unit 511 is the same as the printing job receiving unit 113 in the server apparatus 100 according to the first embodiment. Accordingly, detailed explanation of the printing job receiving unit 511 is omitted.

The analyzing unit 512 analyzes, from the printing job stored in the printing job storage unit 531, density in an image that should be formed. The analyzing unit 512 is the same as the analyzing unit 114 in the server apparatus 100 according to the first embodiment. Accordingly, detailed explanation of the analyzing unit 512 is omitted.

The inquiring unit 513 transmits an inquiry including density information indicating the density analyzed by the analyzing unit 512 and an apparatus ID of the user terminal 300, which is a transmission source of the printing job, to the equipment management server apparatus 400 via the communication interface 54. Further, the inquiring unit 513 receives, via the communication interface 54, machine in use information notified from the equipment management server apparatus 400 as a response to the inquiry.

The printing job transmitting unit 514 transmits, based on an apparatus ID and a network address of the image forming apparatus 200 determined as a machine in use included in the machine in use information received by the inquiring unit 513, the printing job stored in the printing job storage unit 531 to the image forming apparatus 200, which is the machine in use, via the communication interface 54. The printing job transmitting unit 514 is the same as the printing job transmitting unit 116 in the server apparatus 100 according to the first embodiment except that a transmission source of the machine in use information is different. Accordingly, detailed explanation of the printing job transmitting unit 514 is omitted.

Figure 17:
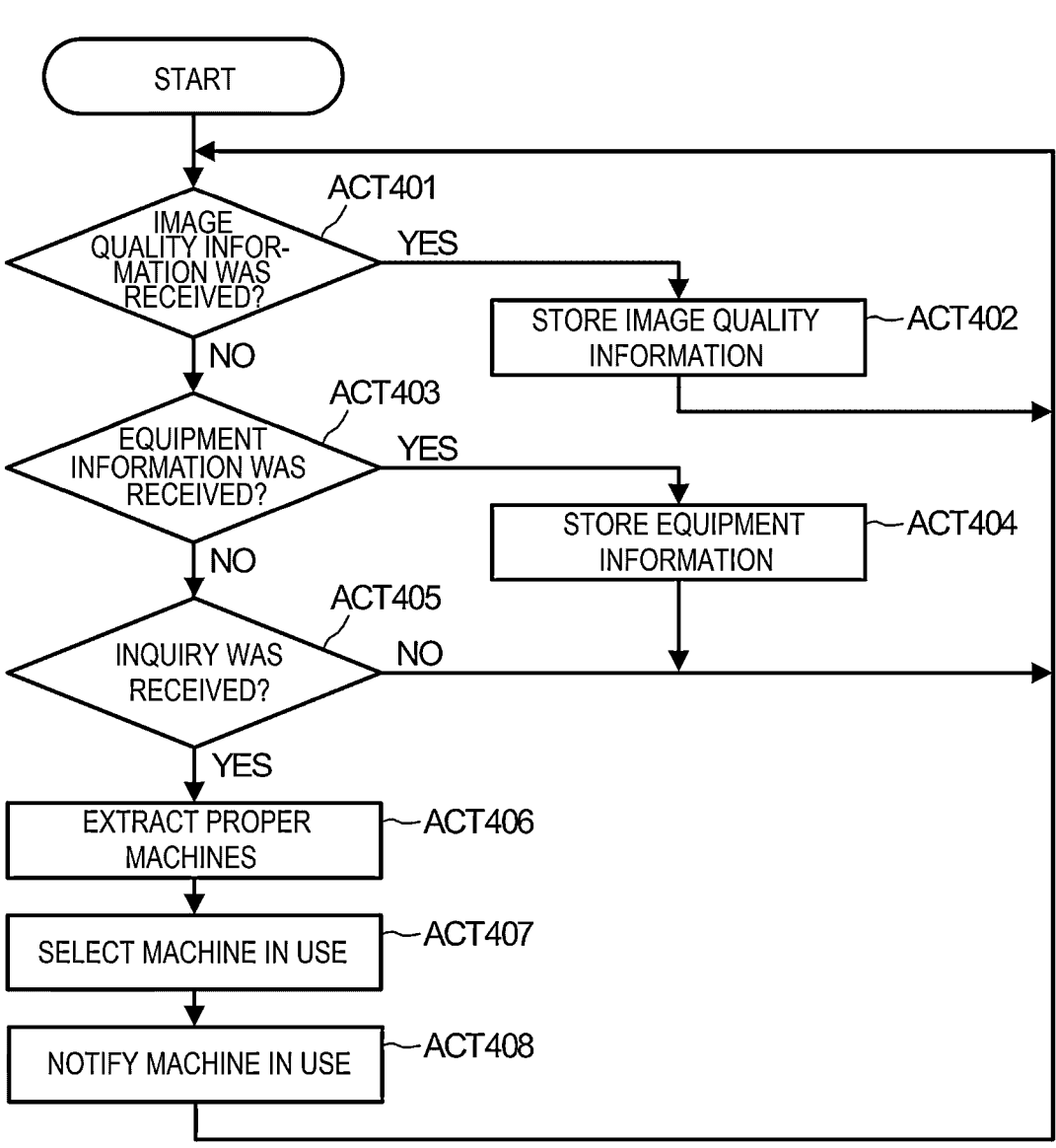
FIG. 17 is a flowchart illustrating an example of equipment management processing in the equipment management server apparatus.

FIG. 17 is a flowchart illustrating an example of equipment management processing in the equipment management server apparatus 400. Note that content of processing illustrated in FIG. 17 and explained below is an example. Various kinds of processing capable of obtaining the same result can be used as appropriate. If the equipment management server apparatus 400 is turned on by operating a not-illustrated power switch, a control program stored in the main memory 42 or the auxiliary storage device 43 starts and the processor 41 executes information processing illustrated in the flowchart based on the control program. Note that, here, it is assumed that, for each of the image forming apparatuses 200 and the user terminals 300 participating in the printing system, data records in which apparatus IDs are set were already registered in the image quality database 431 and the equipment database 432.

Processing operations in ACT 401, ACT 402, and ACT 404 executed by the processor 41 of the equipment management server apparatus 400 are the same as the processing operations in ACT 101, ACT 102, and ACT 104 in the equipment management processing in the server apparatus 100 according to the first embodiment. Determination in ACT 403 and a processing operation in the case in which a result of the determination is YES are the same as the determination in ACT 103 and the processing operation in the case in which the result of the determination is YES in the equipment management processing in the server apparatus 100 according to the first embodiment. Accordingly, detailed explanation of the processing operations is omitted.

In the second embodiment, based on the determination that the equipment information was not received in ACT 403 (NO in ACT 403), in ACT 405, the processor 41 of the equipment management server apparatus 400 operates as the inquiry receiving unit 413 and determines whether an inquiry was received from the operation management server apparatus 500 by the communication interface 14. Based on the determination that an inquiry was not received (NO in ACT 405), the processor 41 shifts to the processing operation in ACT 401 explained above.

Figure 18:
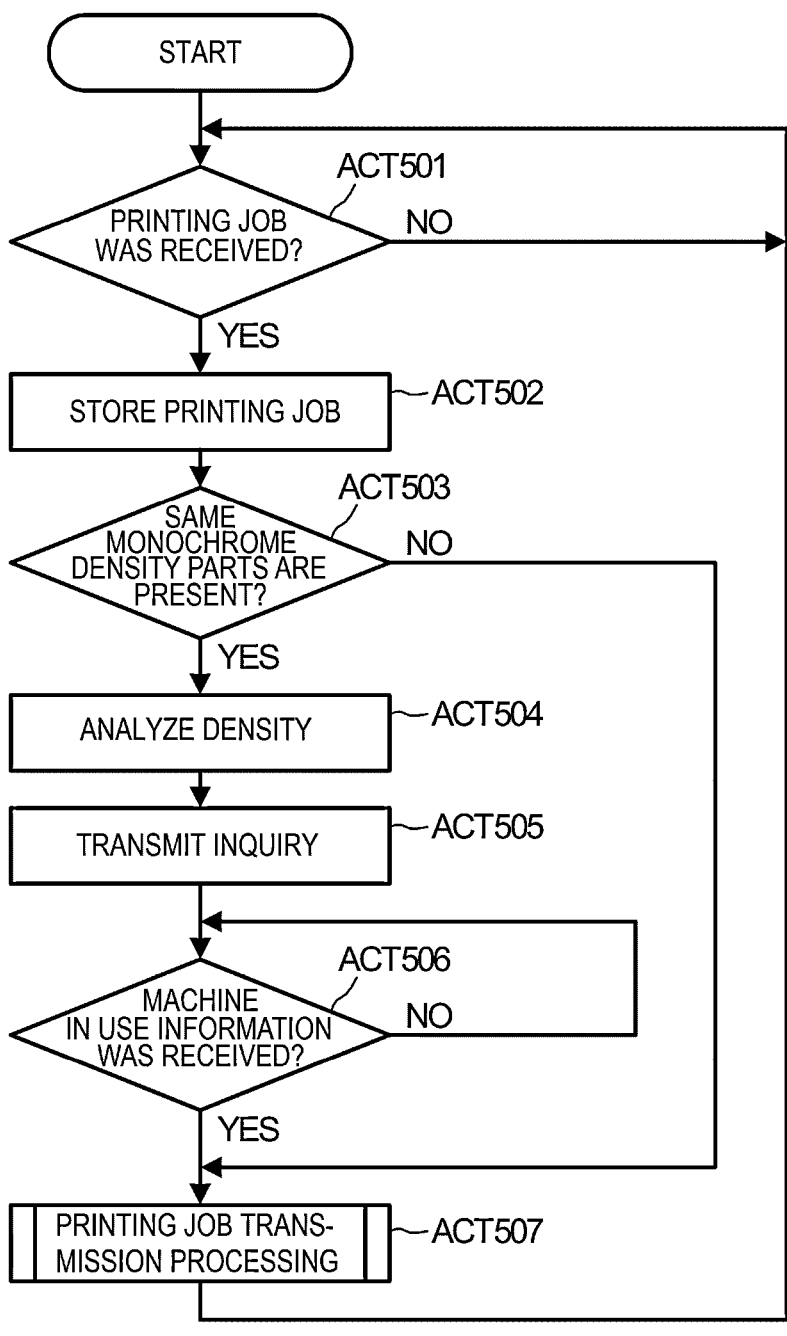
FIG. 18 is a flowchart illustrating an example of equipment management processing in the operation management server apparatus.

FIG. 18 is a flowchart illustrating an example of equipment management processing in the operation management server apparatus 500. Note that content of processing illustrated in FIG. 18 and explained below is an example. Various kinds of processing capable of obtaining the same results can be used as appropriate. If the operation management server apparatus 500 is turned on by operating a not-illustrated power switch, a control program stored in the main memory 52 or the auxiliary storage device 53 starts and the processor 51 executes information processing illustrated in the flowchart based on the control program.

Processing operations in ACT 501, ACT 502, and ACT 504 executed by the processor 51 of the operation management server apparatus 500 are the same as the processing operations in ACT 111, ACT 112, and ACT 114 in the operation management processing in the server apparatus 100 according to the first embodiment. Determination in ACT 503 and a processing operation in the case in which a result of the determination is YES is the same as the determination in ACT 113 and the processing operation in the case in which the result of the determination is YES in the equipment management processing in the server apparatus 100 according to the first embodiment. Accordingly, explanation of the processing operations is omitted.

In the second embodiment, based on the determination that the same monochrome density parts are absent in ACT 503 (NO in ACT 503), the processor 51 of the operation management server apparatus 500 shifts to a processing operation in ACT 507 explained below.

In the second embodiment, after analyzing the densities of the same monochrome density parts from the printing job stored in the printing job storage unit 133 in ACT 504, in ACT 505, the processor 51 operates as the inquiring unit 513 and transmits an inquiry to the equipment management server apparatus 400 via the communication interface 54.

Thereafter, in ACT 506, the processor 51 determines whether machine in use information notified from the equipment management server apparatus 400 as a response to the inquiry was received via the communication interface 54. Based on the determination that the machine in use information was not received (NO in ACT 506), the processor 51 repeats the processing operation in ACT 506. That is, the processor 51 continues the processing operation in ACT 5056 until determining that the machine in use information was received. The processor 51 can also be referred to as waiting for the machine in use information to be received.

Referring back to FIG. 17, based on the determination that an inquiry was received (YES in ACT 405), in ACT 406, the processor 41 of the equipment management server apparatus 400 operates as the machine determining unit 414 and extracts a proper machine out of the plurality of image forming apparatuses 200 based on density indicated by density information included in the received inquiry and the image quality information stored in the image quality database 431. The processing operation in ACT 406 is the same as the processing operation in ACT 115 in the operation management processing in the server apparatus 100 according to the first embodiment except that the density indicated by the density information included in the received inquiry is used. Accordingly, detailed explanation of the processing operation is omitted.

In ACT 407, the processor 41 selects a machine in use out of the plurality of image forming apparatuses 200 extracted as the proper machines in ACT 406. Processing operation in ACT 407 is the same as the processing operation in ACT 116 in the operation management processing in the server apparatus 100 according to the first embodiment. Accordingly, detailed explanation of the processing operation is omitted.

In ACT 408, the processor 41 operates as the machine notifying unit 415 and notifies machine in use information indicating the image forming apparatus 200 selected as the machine in use to the operation management server apparatus 500 via the communication interface 44. Thereafter, the processor 41 shifts to the processing operation in ACT 401 explained above.

Referring back to FIG. 18, based on the determination that the machine in use information was received (YES in ACT 506), in ACT 507, the processor 51 of the operation management server apparatus 500 operates as the printing job transmitting unit 514 and executes printing job transmission processing. The printing job transmission processing is the same as the processing operations in ACT 117 to ACT 126 in the operation management processing in the server apparatus 100 according to the first embodiment. Accordingly, detailed explanation of the printing job transmission processing is omitted. After carrying out the same processing operation of printing job erasure as the processing operation in ACT 120 or ACT 126 in the printing job transmission processing, the processor 51 shifts to the processing operation in ACT 501 explained above.

As explained above, the processor 51 of the operation management server apparatus 500 functioning as the server apparatus according to the second embodiment operates as the printing job receiving unit 511, receives the printing job, which is the job information indicating the image that should be formed transmitted by the user terminal 300, and causes the printing job storage unit 531 to store the received printing job. In this way, the processor 51 functions as a receiving unit. The processor 51 operates as the analyzing unit 512 and analyzes, from the printing job stored in the printing job storage unit 531, the density in the image that should be formed. In this way, the processor 51 functions as an analyzing unit. The processor 51 operates as the inquiring unit 513 and transmits the density information indicating the analyzed density to the equipment management server apparatus 400. The processor 41 of the equipment management server apparatus 400 operates as the inquiry receiving unit 413 and, if receiving an inquiry from the operation management server apparatus 500, operates as the machine determining unit 414, and determines, based on the density information included in the received inquiry and image quality information of each of the plurality of image forming apparatuses 200 obtained by scanning, in each of the plurality of image forming apparatuses 200, the reference paper RP on which monochrome reference images having gradations in the sub-scanning direction of scan are formed in separated positions of at least two parts in the main scanning direction of the scan, a proper machine suitable for forming an image indicated by the printing job out of the plurality of image forming apparatuses 200. The processor 41 operates as the machine notifying unit 415 and notifies the determined proper machine to the operation management server apparatus 500. The processor 51 of the operation management server apparatus 500 functioning as the inquiring unit 513 receives the notification of the proper machine to determine the proper machine. In this way, the processor 51 of the operation management server apparatus 500 functions as first and third portions of a determining unit. The processor 41 of the equipment management server apparatus 400 functions as a second portion of the determining unit.

As explained above, like the server apparatus 100 according to the first embodiment, the server apparatus according to the second embodiment determines a proper machine suitable for forming an image indicated by a printing job out of the plurality of image forming apparatuses 200 by checking, using the image quality information obtained by reading the reference paper RP, on which the reference images are formed, with the scan unit 214 having the image reading performance corresponding to the image forming performance of the image forming unit 205 of the image forming apparatus 200, whether the image forming apparatus 200 has image forming performance suitable for forming the image indicated by the printing job. Accordingly, the server apparatus according to the second embodiment can determine the image forming apparatus 200 that can meet a high-quality printing request of the user.

The first and second embodiments are explained above. However, embodiments are not limited to the first and second embodiments.

For example, in the embodiments explained above, the proper machines are extracted based on the densities and the machine in use is selected by limiting the extracted proper machines according to the position information. However, a procedure for, first, limiting the image forming apparatuses 200 to be extraction targets according to the position information and then extracting a proper machine and selecting the extracted proper machine and the machine in use.

In the embodiments explained above, the control programs are stored beforehand in the main memory 12 or the auxiliary storage device 13 of the server apparatus 100, the main memory 42 or the auxiliary storage device 43 of the equipment management server apparatus 400, and the main memory 52 or the auxiliary storage device 53 of the operation management server apparatus 500. Concerning this point, in writable storage devices included in the server apparatus 100, the equipment management server apparatus 400, and the operation management server apparatus 500, the control programs transferred separately from the server apparatuses may be written according to operation of the administrator or the like. The transfer of the control programs and the like can be performed by storing the control programs and the like in a removable computer-readable storage medium or by communication via a network. A form of the computer-readable storage medium does not matter if the computer-readable storage medium can store programs and can be read by a device like a CD-ROM, a memory card, and the like.

Besides, the several embodiments are explained above. However, the embodiments are present as examples and are not intended to limit the scope of the disclosure. These new embodiments can be implemented in other various forms. Various omissions, substitutions, and changes can be made without departing from the gist of the disclosure. These embodiments and modifications thereof are included in the scope of the invention and included in the scope of the disclosure described in the claims and equivalents of the disclosure.

Further, these embodiments and the modifications thereof can include inventions described below in addition to the disclosure described in the claims.

(1)

The server apparatus according to claim 3, wherein the first direction is a main scanning direction of the scan and the image formation, and the second direction is a sub-scanning direction of the scan and the image formation.

(2)

The apparatus according to claim 1, wherein the determining unit determines the proper machine out of image forming apparatuses limited as machines in use by the user terminal among the plurality of image forming apparatuses.

(3) The apparatus according to claim 1, further comprising a storage unit configured to store the image quality information obtained by each of the plurality of image forming apparatuses.

(4)

The apparatus according to claim 5, wherein the external apparatus includes an image forming apparatus operated by a user who uses the user terminal, which is a transmission source of the job information, and the transmitting unit transmits, according to selection operation for the image forming apparatus determined as the proper machine from an image forming apparatus operated by the user, the job information to the selected image forming apparatus.

What is claimed is:

1. A server apparatus configured to communicate with (i) a plurality of image forming apparatuses respectively having scan functions, and (ii) a user terminal providing an image that should be formed by any one of the plurality of image forming apparatuses, the server apparatus comprising:

a receiver configured to receive job information indicating the image that should be formed transmitted by the user terminal;

an analyzer configured to analyze, from the job information, density information concerning density in the image; and a calculator configured to determine, based on the density information and image quality information of each of the plurality of image forming apparatuses obtained by scanning, reference paper on which monochrome reference images having gradations in a second direction orthogonal to a first direction are formed in separated positions of at least two parts in the first direction, a proper machine configured to form the image out of the plurality of image forming apparatuses.

2. The apparatus according to claim 1, wherein in each of the plurality of image forming apparatuses, the first direction and the second direction are a same direction in the scan and the image formation, the analyzer is configured to analyze, in the image that should be formed, same monochrome density parts present in separated positions of at least two parts in the first direction of the image formation corresponding to the separated positions of the at least two parts in the first direction of the scan, and the calculator is configured to determine the proper machine when the same monochrome density parts are present.

3. The apparatus according to claim 2, wherein the calculator is configured to determine, out of the plurality of image forming apparatuses, as the proper machine, a machine having a small density difference between densities of the same monochrome density parts in the separated positions of the at least two parts in the first direction of the image formation.

4. The apparatus according to claim 1, wherein the server apparatus includes first and second server apparatuses capable of communicating with each other via a network, the receiver and the analyzer are included in the first server apparatus, and the calculator includes:

a first portion included in the first server apparatus and configured to transmit the density information to the second server apparatus;

a second portion included in the second server apparatus and configured to determine the proper machine based on the density information and the image quality information, and notify the determined proper machine to the first server apparatus; and a third portion included in the first server apparatus and configured to receive the notification of the proper machine to determine the proper machine.

5. The apparatus according to claim 1, further comprising a transmitter configured to transmit the job information to the image forming apparatus determined as the proper machine.

6. The apparatus according to claim 1, further comprising a transmitter configured to transmit a determination result indicating the image forming apparatus determined as the proper machine to an external apparatus.

7. The server apparatus according to claim 1, wherein
the first direction is a main scanning direction of the scan and the image formation, and
the second direction is a sub-scanning direction of the scan and the image formation.

8. The server apparatus according to claim 1, wherein the calculator is configured to determine the proper machine out of image forming apparatuses limited as machines in use by the user terminal among the plurality of image forming apparatuses.

9. The server apparatus according to claim 1, further comprising a storage configured to store the image quality information obtained by each of the plurality of image forming apparatuses.

10. A method of communicating with a plurality of image forming apparatuses respectively having scan functions and a user terminal that provides an image that should be formed by any one of the plurality of image forming apparatuses, the method comprising:
receiving job information indicating the image that should be formed transmitted by the user terminal;
analyzing, from the job information, density information concerning density in the image; and
determining a proper machine suitable for forming the image out of the plurality of image forming apparatuses, based on the density information and image quality information of each of the plurality of image forming apparatuses obtained by scanning, in each of the plurality of image forming apparatuses, reference paper on which monochrome reference images having gradations in a second direction orthogonal to a first direction are formed in separated positions of at least two parts in the first direction.

11. The method according to claim 10, wherein
in each of the plurality of image forming apparatuses, the first direction and the second direction are a same direction in the scan and the image formation,
analyzing, in the image that should be formed, same monochrome density parts present in separated positions of at least two parts in the first direction of the image formation corresponding to the separated positions of the at least two parts in the first direction of the scan, and
determining the proper machine when the same monochrome density parts are present.

12. The method according to claim 11, further comprising determining as the proper machine, out of the plurality of image forming apparatuses, a machine having a small density difference between densities of the same monochrome density parts in the separated positions of the at least two parts in the first direction of the image formation.

13. The method according to claim 10, wherein
the server apparatus includes first and second server apparatuses capable of communicating with each other via a network,
transmitting the density information to the second server apparatus;
determining the proper machine based on the density information and the image quality information, and notifying the determined proper machine to the first server apparatus; and
receiving the notification of the proper machine to determine the proper machine.

14. The method according to claim 10, further comprising transmitting the job information to the image forming apparatus determined as the proper machine.

15. The method according to claim 10, further comprising transmitting a determination result indicating the image forming apparatus determined as the proper machine to an external apparatus.

* * * * *